US012774670B2

(12) United States Patent
Bromberg et al.

(10) Patent No.: US 12,774,670 B2
(45) Date of Patent: Oct. 27, 2026

(54) ENHANCED OPERATION OF HYDROGEN AND AMMONIA ENGINES

(71) Applicants: Leslie Bromberg, Sharon, MA (US); Daniel R. Cohn, Bridgton, ME (US)

(72) Inventors: Leslie Bromberg, Sharon, MA (US); Daniel R. Cohn, Bridgton, ME (US)

( * ) Notice: Subject to any disclaimer, the term of this patent is extended or adjusted under 35 U.S.C. 154(b) by 0 days.

(21) Appl. No.: 18/876,890

(22) PCT Filed: Aug. 1, 2023

(86) PCT No.: PCT/US2023/029202
§ 371 (c)(1),
(2) Date: Dec. 19, 2024

(87) PCT Pub. No.: WO2024/035571
PCT Pub. Date: Feb. 15, 2024

(65) Prior Publication Data
US 2025/0376937 A1 Dec. 11, 2025

Related U.S. Application Data

(60) Provisional application No. 63/524,270, filed on Jun. 30, 2023, provisional application No. 63/436,778,
(Continued)

(51) Int. Cl.
*F01N 3/20* (2006.01)
*F01N 3/10* (2006.01)
(Continued)

(52) U.S. Cl.
CPC ............ *F01N 3/208* (2013.01); *F01N 3/101* (2013.01); *F01N 3/2073* (2013.01); *F01N 3/306* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 9,162,203 | B1 | 10/2015 | Miyagawa et al. | |
| 10,280,856 | B2 * | 5/2019 | Fujiwara | F01N 3/0842 |

(Continued)

FOREIGN PATENT DOCUMENTS

| | | | |
|---|---|---|---|
| WO | 2021/257549 | A1 | 12/2021 |

OTHER PUBLICATIONS

International Search Report and Written Opinion mailed Nov. 22, 2023 in corresponding PCT application No. PCT/US2023/029202.

*Primary Examiner* — Binh Q Tran
(74) *Attorney, Agent, or Firm* — Nields, Lemack & Frame, LLC

(57) ABSTRACT

A number of enhancements to the operation of ammonia and hydrogen engines are described. These include improvements to the exhaust treatment systems, where a three-way catalyst plus SCR is used to significantly reduce emissions. Additionally, new approaches for enhanced ammonia powered engine operation using alcohol-based fuels are described. Further, control systems that may be utilized with these engines are described. These control systems use endothermic exhaust heat reforming of a fuel to significantly increase overall engine efficiency. The exhaust heat is used in an endothermic reaction to convert the fuel into a hydrogen rich gas which has more chemical energy than the pre-reformed fuel. The hydrogen rich gas is then combusted in the engine. Also, additional enhancements to the exhaust treatment system when used with ammonia or hydrogen engines are disclosed.

15 Claims, 16 Drawing Sheets

Related U.S. Application Data filed on Jan. 3, 2023, provisional application No. 63/419,180, filed on Oct. 25, 2022, provisional application No. 63/405,560, filed on Sep. 12, 2022, provisional application No. 63/395,971, filed on Aug. 8, 2022.

(51) Int. Cl.
*F01N 3/30* (2006.01)
*F02D 19/06* (2006.01)

(52) U.S. Cl.
CPC ...... *F01N 2430/04* (2013.01); *F01N 2610/02* (2013.01); *F01N 2610/03* (2013.01); *F01N 2900/0408* (2013.01); *F01N 2900/08* (2013.01); *F01N 2900/1402* (2013.01); *F02D 19/0644* (2013.01)

(56) References Cited

U.S. PATENT DOCUMENTS

| | | | | |
|---|---|---|---|---|
| 2007/0209609 | A1* | 9/2007 | Shimada | F02D 19/0692 123/3 |
| 2013/0055703 | A1* | 3/2013 | Toshioka | B01D 53/9495 60/301 |
| 2014/0047821 | A1* | 2/2014 | Kawada | F01N 3/10 60/299 |
| 2014/0053537 | A1* | 2/2014 | Yan | F04B 13/00 137/12 |
| 2014/0060490 | A1 | 3/2014 | Iwai et al. | |
| 2014/0311428 | A1* | 10/2014 | Miyagawa | F01N 3/106 123/3 |
| 2015/0096287 | A1* | 4/2015 | Qi | F01N 3/208 60/286 |
| 2018/0245530 | A1 | 8/2018 | Gates et al. | |
| 2018/0258815 | A1* | 9/2018 | Tanaka | F02D 41/1441 |
| 2018/0334972 | A1 | 11/2018 | Paukner | |
| 2022/0154614 | A1* | 5/2022 | Byrne | F01N 3/208 |
| 2022/0170415 | A1 | 6/2022 | Homma et al. | |
| 2023/0193840 | A1* | 6/2023 | Dillen | F02M 21/0293 123/439 |
| 2023/0265772 | A1* | 8/2023 | Doura | F01N 3/101 60/274 |

* cited by examiner

ENHANCED OPERATION OF HYDROGEN AND AMMONIA ENGINES

This application claims priority of U.S. Provisional Patent Application Ser. No. 63/395,971, filed Aug. 8, 2022; 63/405,560, filed Sep. 12, 2022; 63/419,180, filed Oct. 25, 2022; 63/436,778, filed Jan. 3, 2023; and 63/524,270, filed Jun. 30, 2023, the disclosures of which are incorporated herein by reference in their entireties.

BACKGROUND

There is increasing interest for using hydrogen and ammonia as low-carbon fuels for transportation and stationary electricity production. Spark ignition internal combustion engines can provide advantages of low cost and flexibility of fuel use relative to the use of fuel cells.

Ammonia powered reciprocating engines (engines that use either ammonia directly as a fuel and/or as a means to provide hydrogen which is used to fuel the engine) can provide an attractive means to use a liquid low-carbon fuel for a variety of electricity production applications. Ammonia ($NH_3$) can be regarded as a liquid hydrogen carrier with substantial advantages over hydrogen for storage and transport. The ammonia may be made from low-carbon hydrogen produced from processes that include use of wind, solar or nuclear based electricity to provide electrolysis of water; pyrolytic conversion of natural gas to hydrogen and elemental carbon and/or gasification of waste or biomass.

A particularly important application may be the use of ammonia as a means to store electricity that is provided by excess electricity provided by a grid powered by variable renewable electricity and use of the stored ammonia at a later time in an ammonia engine or system of ammonia engines as a means of providing electricity when there is a short fall in the supply of electricity for the grid.

However, the full potential use of ammonia for powering reciprocating engines for electricity generation has not been realized. For example, ammonia has a slow flame speed. Further, NOx and $N_2O$ emissions, when ammonia is used, may be a concern.

Therefore, it would be beneficial if there were systems that allowed the use of hydrogen or ammonia and overcame these issues.

SUMMARY

A number of enhancements to the operation of ammonia and hydrogen engines are described. These include improvements to the exhaust treatment systems, where the enhanced exhaust treatment (EET) system employs a three-way catalyst plus an SCR (selective catalytic reduction catalyst) that is used to significantly reduce NOx emissions. Additionally, new approaches for enhanced ammonia powered engine operation using alcohol-based fuels are described. Further, control systems that may be utilized to improve the capability of these engines are described. These control systems use endothermic exhaust heat reforming of an alcohol (methanol or ethanol) or ammonia to significantly increase overall engine efficiency. The exhaust heat is used in an endothermic reaction to convert alcohol into a hydrogen rich gas or ammonia into hydrogen which have more chemical energy than the pre-reformed fuel. The hydrogen rich gas in the case of an alcohol or hydrogen in the case of ammonia is then combusted in the engine. Also, additional enhancements to the exhaust treatment system when used with ammonia or hydrogen engines are disclosed.

According to one embodiment, a spark ignition engine fueled with hydrogen is disclosed. The spark ignition engine is fueled with a stoichiometric or substantially stoichiometric air fuel ratio; an exhaust stream from the spark ignition engine passes through a three-way catalyst; and a hydrocarbon fuel is introduced into the exhaust stream before it enters the three-way catalyst. In some embodiments, an amount of the hydrocarbon fuel that is introduced into the exhaust stream from the spark ignition engine is determined by closed loop control using a measurement of NOx that is in an exhaust stream from the three-way catalyst. In some embodiments, an amount of the hydrocarbon fuel that is introduced into the exhaust stream from the spark ignition engine is determined by open loop control using a lookup table that employs information about engine speed, torque and/or pressure. In some embodiments, an amount of the hydrocarbon fuel that is employed is kept below a certain level. In some embodiments, the hydrocarbon fuel is ethanol, an ethanol-gasoline mixture, methanol, a methanol-gasoline mixture or gasoline. In some embodiments, EGR (exhaust gas recirculation) is used to prevent pre-ignition and an amount of EGR is varied based on engine operating conditions using closed and/or open loop control. In some embodiments, introduction of the hydrocarbon fuel into the exhaust stream from the spark ignition engine reduces an amount of NOx in an exhaust stream from the three-way catalyst. In some embodiments, an exhaust stream from the three-way catalyst passes through an SCR catalyst; air and diesel exhaust fluid are added to the exhaust stream from the three-way catalyst prior to its entrance into the SCR catalyst and the air is preheated by employing a heat exchanger using heat sources that include engine coolant or exhaust downstream from the SCR catalyst. In some embodiments, an exhaust stream from the three-way catalyst passes through an SCR catalyst and wherein air and diesel exhaust fluid are added to the exhaust stream from the three-way catalyst prior to its entrance into the SCR catalyst and wherein some of the exhaust from the SCR catalyst is recycled to enter the SCR catalyst.

According to another embodiment, a spark ignition engine that this fueled with ammonia is disclosed. The spark ignition engine is operated with a stoichiometric air/fuel ratio or substantially stoichiometric fuel/air ratio; an exhaust stream from the spark ignition engine is passes through a three-way catalyst; and a hydrocarbon fuel, which is provided by a hydrocarbon fuel tank, is introduced into the exhaust stream before it enters the three-way catalyst. In some embodiments, an amount of hydrocarbon fuel that is introduced into the exhaust stream from the spark ignition engine is determined by closed loop control using a measurement of NOx that is in an exhaust stream from the three-way catalyst. In some embodiments, an amount of the hydrocarbon fuel that is introduced into the exhaust stream from the spark ignition engine is determined by open loop control using a lookup table that employs information about engine speed, torque and/or pressure. In some embodiments, an amount of the hydrocarbon fuel that is employed is kept below a certain level. In some embodiments, the hydrocarbon fuel is ethanol, an ethanol-gasoline mixture, methanol, a methanol-gasoline mixture or gasoline. In some embodiments, introduction of the hydrocarbon fuel into the exhaust stream from the spark ignition engine reduces an amount of NOx in an exhaust stream from the three-way catalyst. In some embodiments, an exhaust stream from the three-way catalyst passes through an SCR catalyst; air and diesel exhaust fluid are added to the exhaust stream from the three-way catalyst prior to its entrance into the SCR catalyst;

and the air is preheated by employing a heat exchanger using heat sources that include engine coolant or exhaust downstream from the SCR catalyst. In some embodiments, an exhaust stream from the three-way catalyst passes through an SCR catalyst; air and diesel exhaust fluid are added to the exhaust stream from the three-way catalyst prior to its entrance into the SCR catalyst; and some of the exhaust from the SCR catalyst is recycled to enter the SCR catalyst. In some embodiments, the diesel exhaust fluid is ammonia from an ammonia tank. In some embodiments, hydrocarbon fuel from the hydrocarbon fuel tank is also sent to the spark ignition engine and is varied so as to provide combustion stability.

According to another embodiment, a spark ignition engine is disclosed. The spark ignition engine is operated with a stoichiometric or substantially stoichiometric fuel/air ratio and is fueled by ammonia from an ammonia tank and by hydrogen that is provided by engine exhaust heat reforming of the ammonia; reforming of ammonia produces both hydrogen and unconverted ammonia; the hydrogen and unconverted ammonia are introduced into the spark ignition engine; an exhaust stream from the spark ignition engine is sent to a three-way catalyst; and a hydrocarbon fuel from a hydrocarbon fuel tank is added to the exhaust stream that enters the three-way catalyst. In some embodiments, the hydrocarbon fuel from the hydrocarbon fuel tank is also sent to the spark ignition engine. In some embodiments, an exhaust stream from the three-way catalyst passes through an SCR catalyst; air and diesel exhaust fluid are added to the exhaust stream from the three-way catalyst prior to its entrance into the SCR catalyst; and the air is preheated by employing a heat exchanger using heat sources that include engine coolant or exhaust downstream from the SCR catalyst. In some embodiments, an exhaust stream from the three-way catalyst passes through an SCR catalyst; air and diesel exhaust fluid are added to the exhaust stream from the three-way catalyst prior to its entrance into the SCR catalyst; and some of the exhaust from the SCR catalyst is recycled to enter the SCR catalyst.

BRIEF DESCRIPTION OF THE DRAWINGS

For a better understanding of the present disclosure, reference is made to the accompanying drawings, in which like elements are referenced with like numerals, and in which.

DETAILED DESCRIPTION

The deployment of hydrogen and ammonia engines may have many benefits. However, there are various issues that need to be addressed before use of these engines may become widespread. This disclosure describes various issues and proposed solutions to these issues. The disclosure is separated into sections, where each section describes a particular issue and provides one or more solutions to address that issue.

The first section describes an enhanced exhaust treatment (EET) system that includes a three-way catalyst and a selective catalytic reduction catalyst, also referred as to as a SCR.

The second section describes new approaches for enhanced ammonia powered engine operation using alcohol-based fuels.

The third section is directed toward a control system for these engines, especially when they use endothermic exhaust heated reforming. Endothermic exhaust heat reforming of a fuel (such as methanol, ethanol or ammonia) that is employed in reciprocating engines may be utilized to significantly increase overall engine efficiency. The exhaust heat is used in an endothermic reaction to convert the fuel into a hydrogen rich gas which has more chemical energy than the pre-reformed fuel. The hydrogen rich gas is then combusted in the engine.

The fourth section is directed toward additional improvements to the enhanced exhaust treatment system when used with ammonia or hydrogen engines.

I. Enhanced Exhaust Treatment System

As noted above, NOx emissions, when ammonia or hydrogen is used, may be a concern. This section describes an enhanced exhaust treatment system that may be used with hydrogen and ammonia engines. Importantly, this enhanced exhaust treatment system is also suitable for spark ignition engines that are powered by gasoline and other fuels, as explained below.

Figure 1:
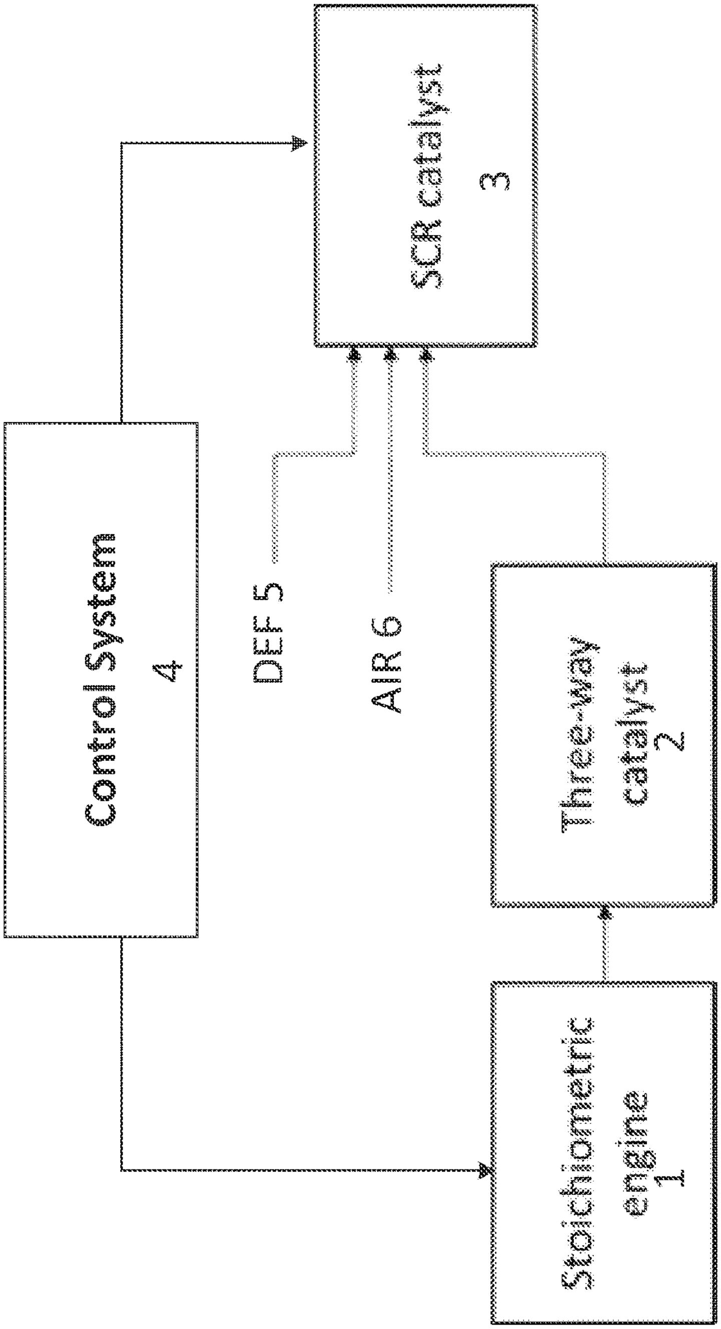
FIG. 1 shows a SCR system downstream from a 3-way catalyst wherein the three-way catalyst receive exhaust from an engine operating with a stoichiometric or substantially stoichiometric fuel/air ratio. In this system, a diesel exhaust fluid (DEF), which may be urea, ammonia or another substance, and additional air is introduced upstream from the SCR catalyst. In some embodiments, the SCR may provide at least an 80% reduction of the NOx in the exhaust stream from the three-way catalyst. The engine is preferably a spark ignition engine.

This extremely-low NOx exhaust treatment system is illustrated in FIG. 1. FIG. 1 shows an engine 1 that is operated with a stoichiometric or substantially stochiometric air/fuel ratio as is used with a three-way catalyst 2 and employs an SCR (selective catalytic reduction) catalyst 3 for further reduction of NOx in the exhaust by a three-way catalyst. In this disclosure, "substantially stochiometric" denotes a slightly rich or slightly lean ratios where the air/fuel ratio differs by up to 3% from the stoichiometric air fuel ratio. In this figure, a control system 4, which may be an embedded controller, a special purpose processor, a microcontroller, or another computing system, is used to control the operations of the various components. This control system 4 is used to provide the operation, control and monitoring described herein.

Figure 5:
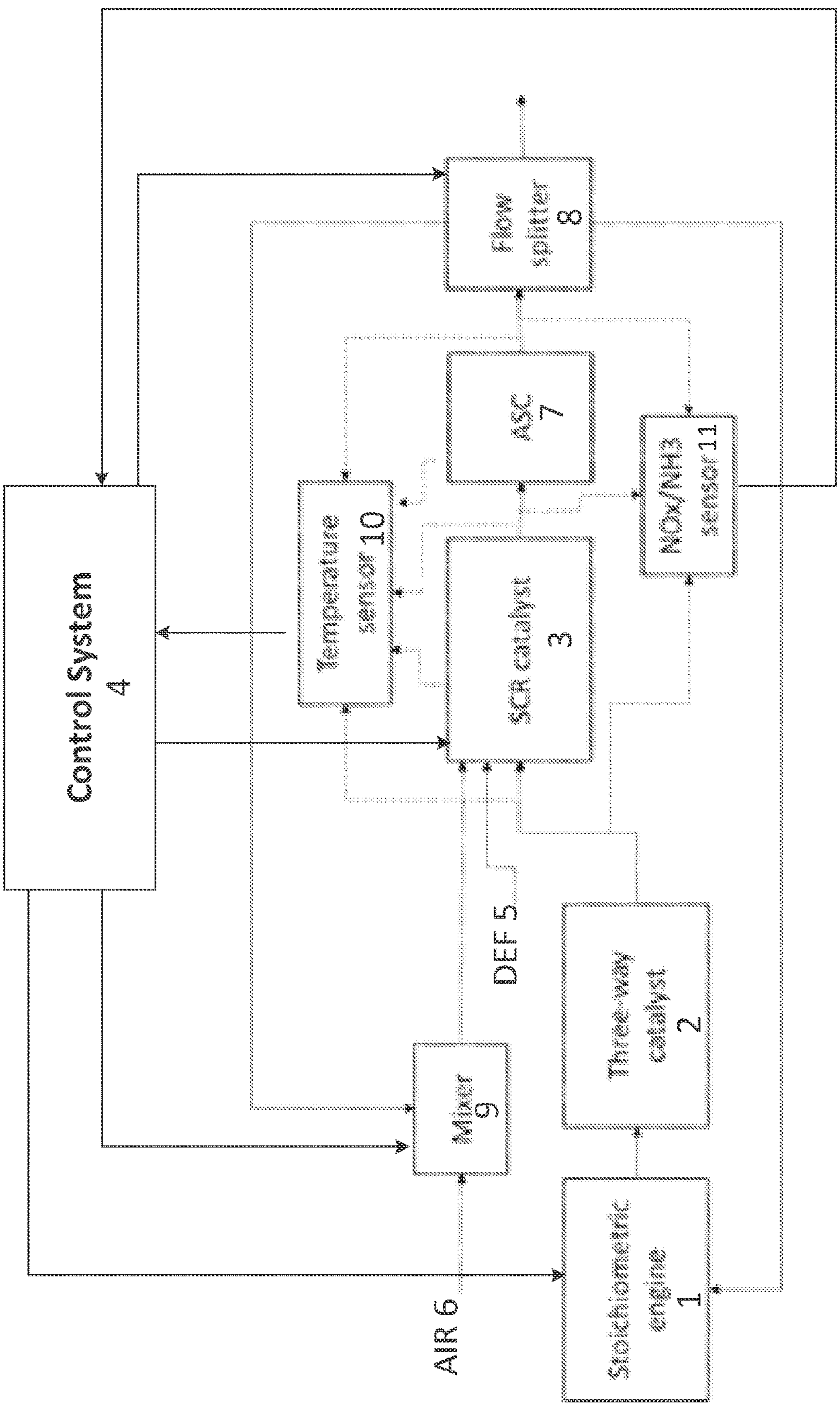
FIG. 5 shows the system with temperature, NOx and ammonia sensors for controlling the dosing rate of DEF/urea/ammonia and/or the amount of air that is recirculated. Exhaust is recirculated to the SCR system and to the engine.

A Diesel Exhaust Fluid (DEF) 5, which may be urea, ammonia or another fluid, such as a hydrocarbon or hydrogen, is employed for the NOx reduction by the SCR catalyst 3 and air 6 is added so as to provide the lean air/fuel ratio conditions needed for most effective SCR operation. The amount of air 6 that is added is controlled by one or more of the sensors that are shown in FIG. 5, which include temperature sensors 10 and emission sensors 11.

The combination of stoichiometric of substantially stoichiometric engine operation with use of a 3-way catalyst 2 decreases the concentration of NOx that is exhausted to the environment to lower than 30 ppm. The optimized combination of a three-way catalyst 2 with an SCR catalyst 3 or catalysts further decreases the NOx concentration by at least a factor of 5, to single ppm digits (e.g. to less than 5 ppm and preferably less than 1 ppm).

It may be advantageous for the engine 1 to be mostly operated at a narrow set of conditions (e.g. 3400-3800 rpm, i.e. plus or minus 200 rpm around 3600 rpm and 6-10 bar IMEP) at relatively high load and power (which can be referred to as "the sweet spot"), which may be the case for an engine in a series hybrid vehicular powertrain or stationary power engine, which may be used for generation of electricity for other various mechanical power applications.

The engine 1 may employ open throttle operation and/or operation at an illustrative engine speed that is greater than 2800 rpm. This operation may ensure adequate exhaust temperature, such as greater than 200 C, for both the desired operation of the three-way catalyst 2 and the SCR catalyst 3 downstream from the three-way catalyst.

The higher exhaust temperature from an engine with a stoichiometric or substantially stoichiometric fuel/air ratio in comparison to a lean burn engine facilitates more effective operation of the SCR catalyst Specifically, $\lambda$ is ~0.98-1.02 for a stoichiometric engine vs. $\lambda>1.25$ for a lean burn engine.

The SCR catalyst efficiency is a function, among other factors, of the oxygen concentration in the gas flow as well as the temperature. For temperatures higher than about 250 degrees C., oxygen concentrations of only 2% or less may be needed for high efficiency. For lower temperatures, it may be necessary to use higher oxygen concentrations, such as up to 5%, but preferably up to 2.5%.

In addition, it is desirable to have temperatures lower than about 350-400 C for optimal performance of the SCR catalyst 3 for NOx conversion and prevention of the formation of $N_2O$. The adjustment of the amount of fresh air that is used may be used by the control system 4 to control the temperature of the SCR catalyst 3.

Control of the Diesel Exhaust Fluid 5 dosing of the SCR 3 by the control system 4 may also be facilitated by the constant or narrow range of operating conditions, both in terms of temperature and exhaust flow rate.

It may be desirable to control both the emissions of NOx and the amount ammonia that is used when SCR 3 is employed.

Figure 2:
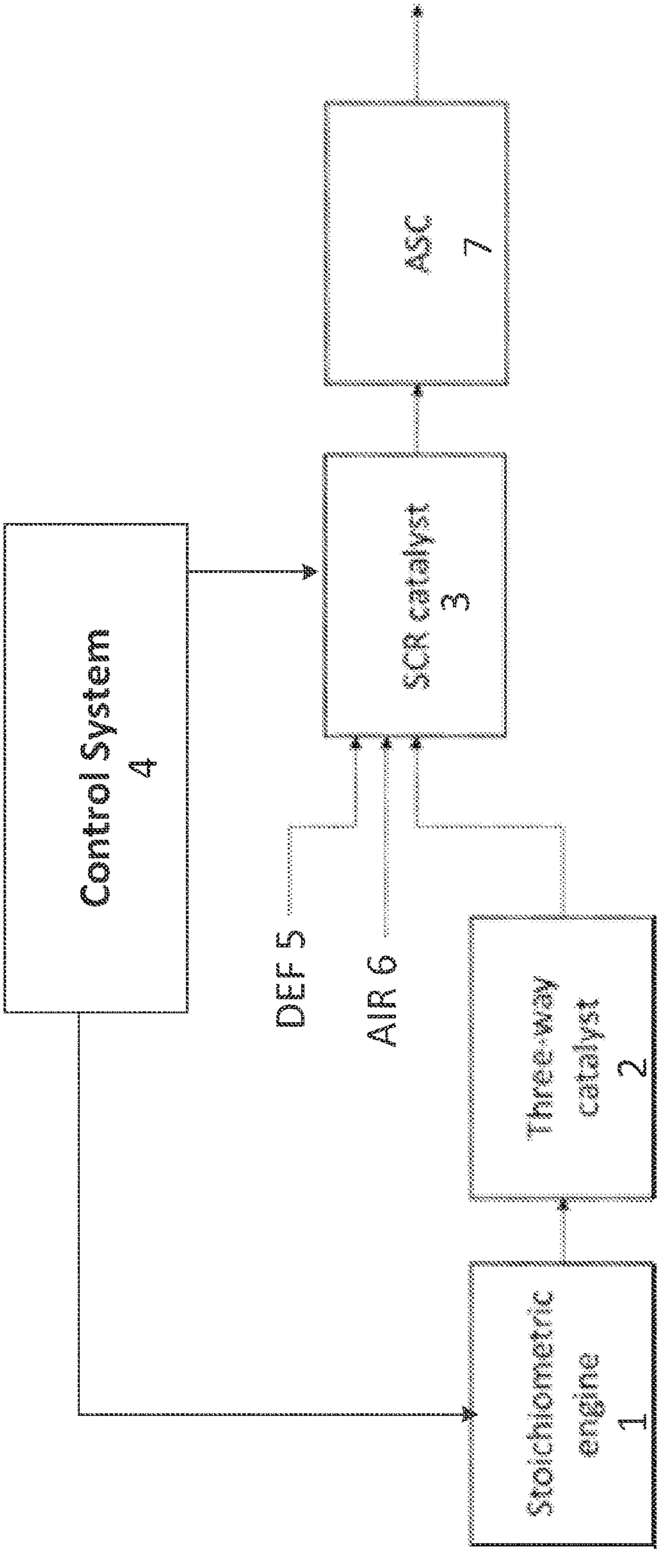
FIG. 2 shows the system for FIG. 1 with an addition of an ammonia slip catalyst (ASC). The purpose of the ammonia slip catalyst is to avoid emissions of raw ammonia into the environment.

Various methods may be used for the prevention of ammonia release, including an ammonia oxidation catalyst (ammonia slip catalyst, ASC 7) downstream of the SCR 3, if needed. An ASC 7 is shown in FIG. 2. FIG. 2 shows the same configuration as FIG. 1 with the inclusion of an ASC 7 at the output of the SCR 3.

The ammonia entering the three-way catalyst 2 or the ammonia/NOx in the SCR exit may be measured to provide closed loop feedback control, as shown in FIG. 5. In addition, an open-loop control is also possible, by itself or in combination with a closed loop control system. The open loop control may use predetermined information about flow rate, temperature, NOx levels, and/or hydrogen/hydrocarbon slip.

A variety of configurations can be employed for optimizing the use of the SCR system 3 downstream from the 3-way catalyst 2. For example, in order to prevent the air addition from considerably cooling the gas potentially to a temperature that is below the light-off temperature of the SCR catalyst 3, where the catalyst would be ineffective, the air 6 that is introduced into the exhaust treatment system may be preheated to above 150 C but preferably above 200 C.

The preheating can be provided by a heat exchanger using heat-sources that include the engine coolant, the exhaust downstream from the SCR 3 or the SCR/ASC catalyst (if used). These heating sources are located upstream from the SCR and may be used separately or together, with the goal of maintaining the temperature of the SCR in a desired temperature range, such as between 200 C and 400 C.

The use of heat from one or more of these heat sources may be controlled by employment of sensors that measure the temperature of the exhaust gas that is fed into the SCR catalyst 3. Sensors that measure the temperatures of the heat sources may also be employed to determine whether or not they would be utilized. The location of these sensors is shown FIG. 5. The temperature can be controlled by controlling the flow rate of air and/or exhaust.

Figure 3:
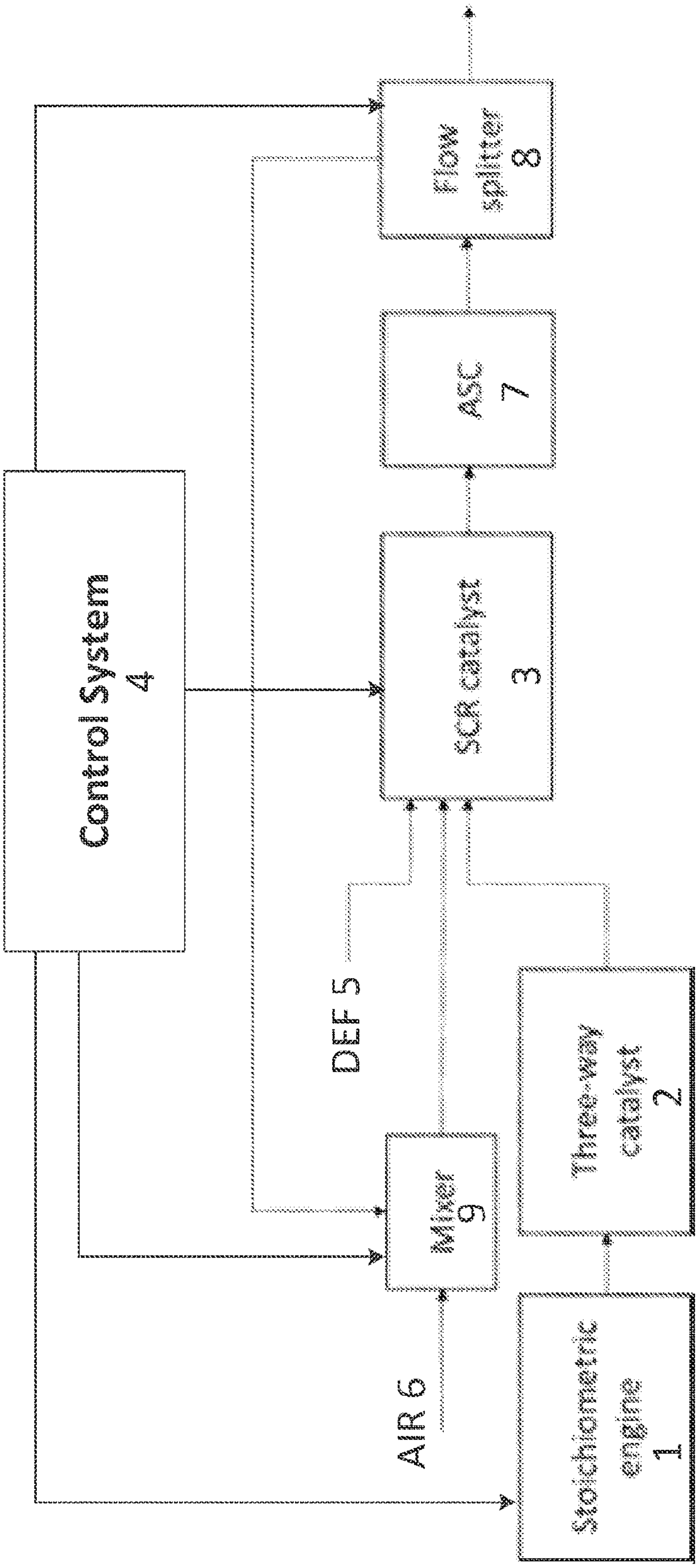
FIG. 3 shows the system of FIG. 2 where a fraction of the flow from the ASC is recirculated to the SCR catalyst, reducing the amount of fresh air required for the SCR system.

In addition to preheating of the air, or instead of preheating air, recycling of a fraction of the exhaust flow that leaves the SCR catalyst 3 or catalysts may be used. A flow splitter 8 downstream from the SCR catalyst 3 may be used to provide recycling of the exhaust, which contains free oxygen as shown in FIG. 3. This recycled exhaust is combined with air 6 in the mixer 9. For the SCR system, the fresh oxygen/air required for the process may thus be decreased, decreasing the cooling effect of the introduced air, as the exhaust temperature is at above-ambient. While FIG. 3 shows exhaust from the ASC 7 being recycled to re-enter the SCR catalyst 3, in other embodiments, as described herein, the exhaust directly from the SCR catalyst 3 may be recycled to re-enter the SCR catalyst 3.

The recycling of the exhaust serves the purpose of further reducing the emissions of NOx and ammonia, as a fraction of the exhaust goes multiple times through the catalyst, at the expense of slightly reduced residence time. In one embodiment, the ASC 7 may be placed in the leg from the flow splitter 8 that does not recirculate into the three-way catalyst. Thus, the temperature of the SCR system may be controlled by the control system 4 based on the temperature of the exhaust, the amount of fresh air introduced into the SCR system, the amount of recirculated exhaust into the SCR system, and/or the use of a heat exchanger to adjust the temperature of the gases introduced into the SCR 3 (fresh air or recirculated exhaust).

Figure 4:
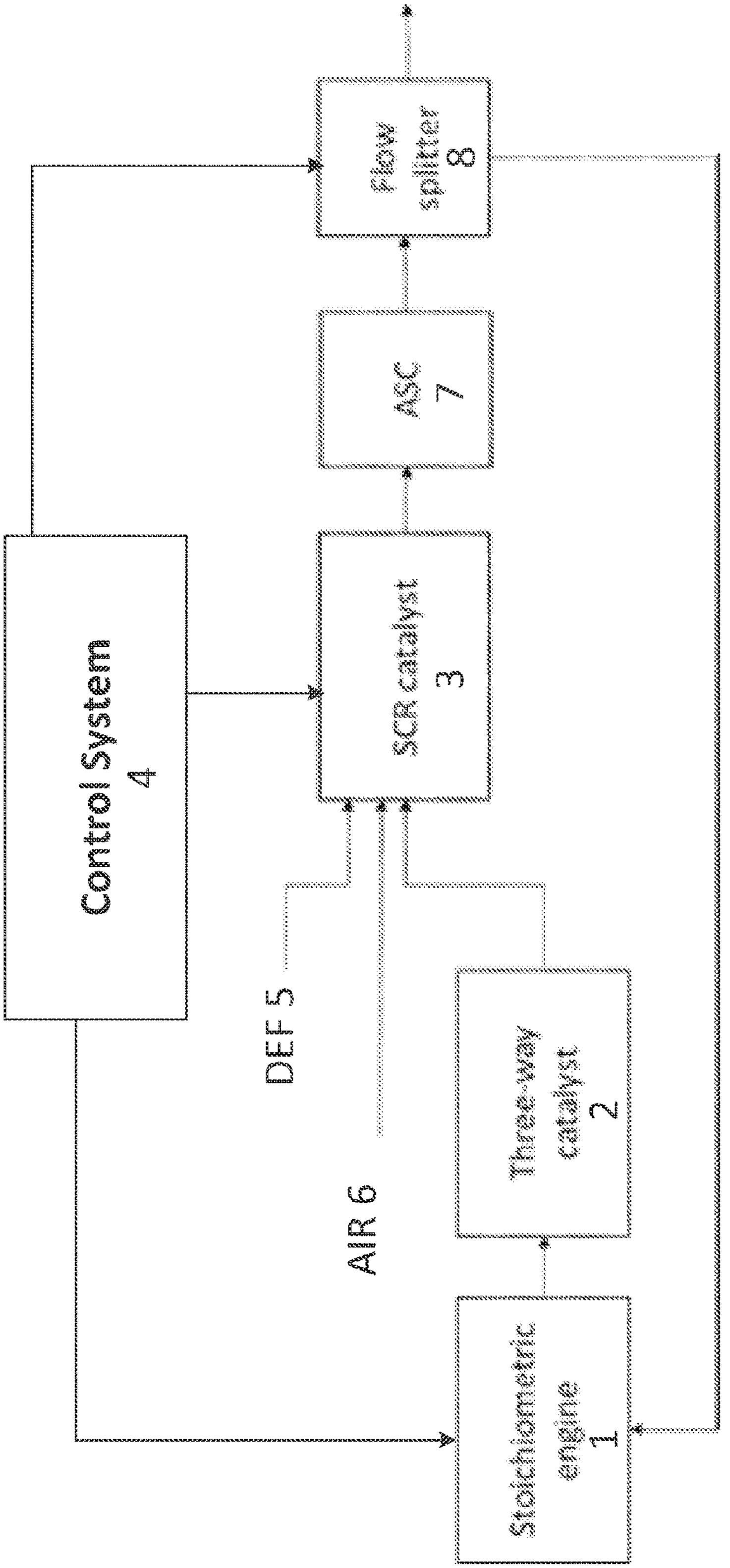
FIG. 4 shows the system where a fraction of the flow from the ASC is recirculated to the engine as engine gas recirculation (EGR), where the engine operates with a stoichiometric or substantially stoichiometric fuel/air ratio.

In addition, the flow splitter 8 may be used to provide exhaust that can be used in the engine, as engine gas recirculation (EGR). This is shown in FIGS. 4 and 5. In this case, the exhaust recirculation that is reintroduced into the engine as EGR has reduced NOx concentrations. A small blower may be used to provide the required pressure. Additionally, as shown in FIG. 5, the flow splitter may be used to provide exhaust to both the SCR and the engine. FIG. 5 also shows sensors for measuring temperature, NOx and ammonia.

Multiple SCR catalysts may be employed. If more than one SCR catalyst (sometimes referred as a "brick") is used, multiple ammonia (or ammonia precursor, such as urea) injection points may be used. The ammonia/ammonia precursor may be introduced upstream of the first brick to provide the bulk of the conversion. The second brick may utilize some of the ammonia slip from the first brick, as well as an additional ammonia/ammonia precursor introduced upstream of the second brick. Similarly, the air may be introduced upstream of the first brick; and additional air may be introduced in-between catalyst bricks.

The air 6 may be introduced in continuous stream or streams, with adjustment of how much air is introduced at various points in the exhaust stream depending on determinations of exhaust characteristics. These characteristics, such as temperature, may be measured and used in closed loop control to control the amounts of air that are introduced at various locations in the SCR system that treats the exhaust downstream from the three-way catalyst.

As an alternative to continuous streams, the air 6 may be introduced by periodic brief pulses. The duty cycle and the amount of air 6 plus three-way catalyst exhaust that is introduced in each pulse may be adjusted to provide appropriate response of the catalyst. In addition, the ammonia or ammonia precursor, such as, for example, urea, may also be introduced in a continuous but varying stream, or in a sequence of brief pulses of appropriate instantaneous flow rate and duty cycle to optimize the performance of the catalyst. Improved distribution of the ammonia in the catalyst may be achieved through short pulses.

An alternative or augmentation to adding air downstream of the engine is to operate the engine air-rich (excess air) for brief periods of time to introduce the required oxygen needed for the SCR catalyst 3.

A system for measuring the status of the overall exhaust treatment system is needed for optimal performance. The sensing system may include temperature, flow rate, which may be determined from conditions upstream from the engine, and NOx concentration. NOx measurements may be made upstream and downstream of the catalyst. In the case of multiple SCR catalysts, a measurement in-between the catalysts may also be used. NOx released to the atmosphere may also be monitored. These measurements can be used by the control system to control various parameters, including air and heat addition from air recirculation or preheating.

There are multiple methods of controlling the ammonia/ammonia precursor dosing. It may be controlled by the measured NOx concentration upstream and downstream from the SCR brick or bricks. In the case of multiple catalyst bricks, the ammonia deposited in each brick may be used to control the dosing of the ammonia, for the cases of a single injector or for multiple injectors of ammonia/ammonia precursor.

Alternatively or in addition, it is possible to monitor the ammonia deposited in the SCR catalyst 3. One method of determining the ammonia deposited in the catalyst is to use RF electromagnetic radiation measurements of ammonia. The RF technology may allow the use of a single sensor to determine the ammonia loading in multiple catalyst bricks by using multiple frequencies.

The various control systems described above can thus be used to both increase the effectiveness of SCR in reducing NOx in the exhaust from the three way catalyst 2; and to reduce the amount of ammonia that is required for desired SCR operation. The control system 4 may be configured to address either or both of these reduction goals by using sensors 10,11 to measure parameters that include, but are not limited to, exhaust temperature at various downstream locations in the exhaust flow from the engine, NOx levels at one or more location and ammonia levels at one or more locations. Information about these parameters may be used to control adjustments of various parameters that may be used to achieve the objectives of NOx reduction and reduction and/or minimization of ammonia use. These adjustable parameters include, but are not limited to, exhaust gas recirculation; exhaust preheating prior to entering the SCR; SCR temperature; fresh air addition to the three way catalyst exhaust stream; use of EGR; and use of excess oxygen from adjustment of engine operation.

The three-way catalyst plus SCR exhaust treatment systems that are described above may be used with engines that use stoichiometric or substantially stoichiometric fuel/air operation (especially spark ignitions engines) and are powered by fuels that include gasoline, ethanol, methanol, natural gas, biogas, propane, hydrogen and/or ammonia. These engines can be operated with no or various levels of EGR including heavy EGR. (e.g. 30% EGR or greater). The engines may be used in engine powered generator systems or in vehicular propulsion including propulsion using mechanical and/or electrical drivetrains.

One vehicle propulsion area for use of the three-way catalyst plus SCR enhanced exhaust treatment systems is for heavy duty trucks and especially long haul trucks that use spark ignition or compression ignition engines operated with stoichiometric or substantially stoichiometric fuel/air operation and are operated at varying torque and speed with a mechanical drive train. These engines may be flexibly fueled with fuels that include but are not limited to natural gas, biogas, hydrogen, gasoline, ethanol, ethanol and ammonia, or mixtures of these fuels, or combinations of these fuels using separately controlled injection of two (or more) different fuels. The extremely low NOx emission that is obtained from use of the optimized three-way catalyst plus SCR exhaust treatment systems may meet very stringent requirements for air pollution in certain high pollution areas.

These enhanced exhaust treatment systems may also be used to reduce emissions from flexibly fueled engines that are used in plug-in hybrid or range extender serial hybrid power trains where the engine powers a generator that provides electricity for electrical motors that propel the vehicle and/or for a battery that provides electricity to electric motors.

Another application area for the optimized three way catalyst plus SCR exhaust treatment system is for hydrogen fueled engines for vehicular or stationary power that are operated with a stoichiometric or substantially stoichiometric fuel/air ratio which may use EGR, including heavy EGR (e.g. EGR equal to or greater 30%). This engine may be used with a mechanical drive train or with an electric drive train in a vehicle or for stationary power generation. Use of the optimized three way catalyst plus SCR exhaust treatment system may make the engine an extremely low emission engine since there are no hydrocarbon emissions.

In addition to use with new engines, the three-way catalyst plus SCR exhaust treatment systems described here may be added to the exhaust treatment systems of existing vehicular or stationary spark ignition engines or other engines using stoichiometric or substantially stoichiometric operation. In this way, the exhaust treatment systems of existing engines could be upgraded to meet new more stringent air quality regulations Increased levels of EGR can be facilitated by use of a prechamber or other means to improve combustion stability. Engine operation with heavy EGR can further reduce the exhaust emissions from the three-way catalyst plus SCR exhaust treatment systems.

The three way catalyst plus SCR exhaust treatment systems described above may be especially suitable for ammonia engines or alcohol boosted ammonia engines, which are defined as ammonia engines using a small amount of varying alcohol, such as ethanol or methanol, addition to boost flame speed and combustion.

The ammonia for three way catalyst plus SCR exhaust treatment system may come from the fuel tank for the engine rather than from a separate tank containing a diesel exhaust fluid. Moreover, ammonia that slips through the SCR may be recycled to the fuel tank. A resulting relaxation in the need to minimize ammonia use for the SCR may enable further increase in the effectiveness in the SCR in reducing NOx in the exhaust from the three way catalyst.

An ammonia engine or alcohol enhanced (or "alcohol boosted") ammonia engine may have both extremely low NOx and no, or extremely low, hydrocarbon emissions from the combustion of the alcohol in an alcohol enhanced ammonia engine.

Among the uses of an engine using dual fuel alcohol-ammonia fueling, defined as separately controlled alcohol and ammonia fueling, may be the use of reformed alcohol for cold start of an engine that is mainly fueled by ammonia. The alcohol (methanol or ethanol) or these fuels in mixtures with gasoline (such as E85 or M85) may be rapidly converted into hot syngas ($H_2$+CO) which may be used for low emissions during engine cold start or restart. The rapid conversion of alcohol to hot syngas may use electrically boosted reforming, such as plasma reforming.

The optimized three-way catalyst plus SCR exhaust treatment systems described herein may be used with the ammonia, alcohol enhanced ammonia and alcohol engine systems described in the following sections.

Use of three-way catalyst plus SCR exhaust treatment systems with these ammonia or ammonia enhanced engines may also be used in ammonia based grid energy storage applications for high efficiency, extremely low emissions conversion of fuel energy for electricity when needed by the grid. Depending on the capacity factor and electric power level of the fuel conversion facility the engine generators may use modified light duty vehicle engines, heavy duty vehicle automotive derived engines or modified large cylinder (e.g., greater than 2000 cc per cylinder) stationary power engines, respectively, as capacity factors and electric power levels of the fuel conversion facility increase. Optimized three-way catalyst plus SCR exhaust treatment systems employed with these engine generators may also be used in conversion of marine shipped low carbon ammonia into electricity.

II. Alcohol Enhanced Ammonia Engines

Use of ammonia as a fuel is challenging because of its very low flame speed leading to combustion instability in substantial regions of the engine operating map. This low flame speed limits the engine, speed and torque that can be employed. This limitation becomes an increasingly constraining with increasing engine cylinder size.

Automotive-Derived Engines

The ammonia powered reciprocating engines described herein may preferentially use automotive engine-scale cylinders (such as cylinders with a volume of less than 1 liter and preferably less than 0.5 liter) in order to reduce the adverse combustion stability impacts of the low flame speed of ammonia. The bore/stroke ratio of the cylinder for a given cylinder volume may also be chosen so as to maximize the engine speed that can be used.

Stoichiometric spark ignition engine operation is also preferred because, in contrast to lean burn engines, it provides advantages of higher power density operation, greater combustion stability and use of highly effective three-way catalyst exhaust emission reduction for ammonia engines. In addition, stoichiometric operation results in increased exhaust temperature, which is useful when employing waste heat recovery which may employed to reform ammonia into hydrogen which may then be used as a fuel for the engine.

Automotive-derived engines are additionally preferred because of their cylinder size, stoichiometric fuel air operation and use of a three-way catalyst. In addition they can provide high engine power density operation by high engine speed operation (e.g. greater than 3000 rpm).

The lowest cost per KW of electricity that is generated automotive-derived spark ignition engines can be derived from light duty vehicle engines. Another option may be to use more expensive spark ignition engines that have been developed for heavy duty trucks that are powered by natural gas. These engines have the advantage of longer lifetimes and can be more suitable for higher capacity factor operation (e.g. greater than 20% than light duty vehicle engines).

Electricity generation power systems that provide a desired amount of electricity generation can be provided by multiplexed use of a number of engine-powered generators. These power systems can be composed of power modules that are containers that are hauled by truck and contain multiple ammonia engine powered generators. For example, a 53 ft container could house at between 10 and 24 automotive-derived engine powered generators and produce 2 to 4 MW of electricity. The power provided by the power module may be varied by turning individual engines on and off. Electricity generation systems of desired power levels from a few MW to a few MW may be provided by use of the appropriate number of power modules. The power from the generation system may be adjusted by turning power modules on and off and/or turning the individual engines in a power module on and off.

The automotive-derived engine ammonia powered generators using alcohol-based fuel enhancement could be operated with ammonia alone or with hydrogen produced by decomposition of some or all of the ammonia (converting the ammonia into "cracked ammonia"). The decomposition/cracking of the ammonia into hydrogen that can be provided by exhaust heating reforming is described in the following section.

The automotive-derived engine would typically be operated for most of its operating time at a given engine torque and speed or narrow region of torque and speed that provides a power level that is desired (e.g. a relatively high power density for economic reasons) while also providing sufficient engine lifetime. This power level would be typically be between 50 and 70% of its potential peak power and speed assuming there is no limit on engine speed that results from the low flame speed of ammonia. Open throttle operation, (when a sufficiently high torque is called for) may be used to increase efficiency and provide high levels of torque and turbocharging.

It is desirable for the chosen operating point or region be at values of engine temperature, pressure, torque and engine speed that have better combustion stability than other regions, such as regions of lower engine temperature, lower engine pressure, and lower engine torque.

One embodiment of the automotive-derived engine generator is for the engine to be turbocharged and operated with a high compression ratio (e.g. a compression ratio of 12-14). This operation can provide higher pressures and temperatures which increase flame speed and combustion stability.

Higher cylinder charge temperature may also be provided by reducing or removing intercooling of the turbocharger, if used, especially at light load (e.g. less than 40% of maximum torque) when knock is not present. In addition, if waste heat energy recovery is employed, it may be useful to introduce the fuel (either cracked ammonia or unconverted ammonia) at relatively high temperature, to increase the temperature of the air/fuel mixture (e.g. to greater than 50 C) improve combustion stability.

Alcohol-Based Fuels

Startup of an ammonia powered engine on the way to the desired torque and speed operating region for electricity generation may involve going through engine temperature torque, speed and pressure portions of the engine map where the combustion stability is inadequate because of low engine temperature (e.g., less than 25 C). This issue may be addressed by using a second fuel which may be stored separately from the ammonia and has both a high flame speed and high octane number, such as for example, an octane number similar to ammonia, for cold start and for transitioning to the engine speed and torque at which the engine would be generally operating. Second fuels with high flame speed and high octane that may be particularly attractive are alcohol-based fuels, which may be ethanol, methanol or a high alcohol concentration mixture of these fuels with gasoline (for example, with a volumetric concentration of 50% or greater such as E85 or M85, which can reduce cold start emissions). The ethanol or methanol or their mixtures with gasoline would be provided by a second tank. The methanol may be a low-carbon fuel produced from waste, biomass, CO2 and/or renewable electricity and/or methanol produced from a fossil fuel such as natural gas.

The alcohol-based fuels may be introduced by direct injection or open-valve port fuel injection in order to add evaporative cooling knock resistance to the already high chemical knock resistance of the alcohol fuels. Conventional closed valve port fuel injection may be used during cold start to minimize particulate emissions followed by open-valve port fuel injection during warmed up operation to provide additional knock resistance.

Control of Fueling of Alcohol-Based Fuel in Alcohol Enhanced Ammonia Engines

The fractional amount of fueling provided by the high flame speed, high octane alcohol-based fuels may be determined using open loop control. The open loop control determines the fractions of total fueling that are provided by an alcohol-based fuel; liquid ammonia; gaseous ammonia and or partially decomposed ammonia (where partially decomposed ammonia may include ammonia, hydrogen and nitrogen) based on parameters that include engine torque, speed, engine temperature and time after engine start.

This fractional amount of fueling that is provided by alcohol-based fuel may also be determined by closed loop control using a misfire sensor to determine when it can be decreased (or must be increased) and when the fractional amount of fuel from ammonia can be increased (or must be decreased). A knock detector may be also be used to determine when the fractional amounts are such as to prevent knock. The knock detector may also be employed to determine when and how much turbocharging intercooling is used at a given engine speed and torque without an unacceptable level of combustion stability (e.g. misfire).

The control system may also call for reduction or removal of intercooling of the air going into a turbocharged engine. This would increase engine charge temperature, thereby increasing combustion stability. However, this may produce engine knock. The knock detector can determine when intercooling needs to be turned on or increased to prevent knock.

The control system may also be employed to call for and regulate preheating of fuel to increase engine temperature and combustion stability.

In addition to an alcohol-based fuel, the use of hydrogen produced by decomposition of some of the ammonia may be employed and controlled in the same way as above. Ammonia decomposition is described in the following section.

Figure 6:
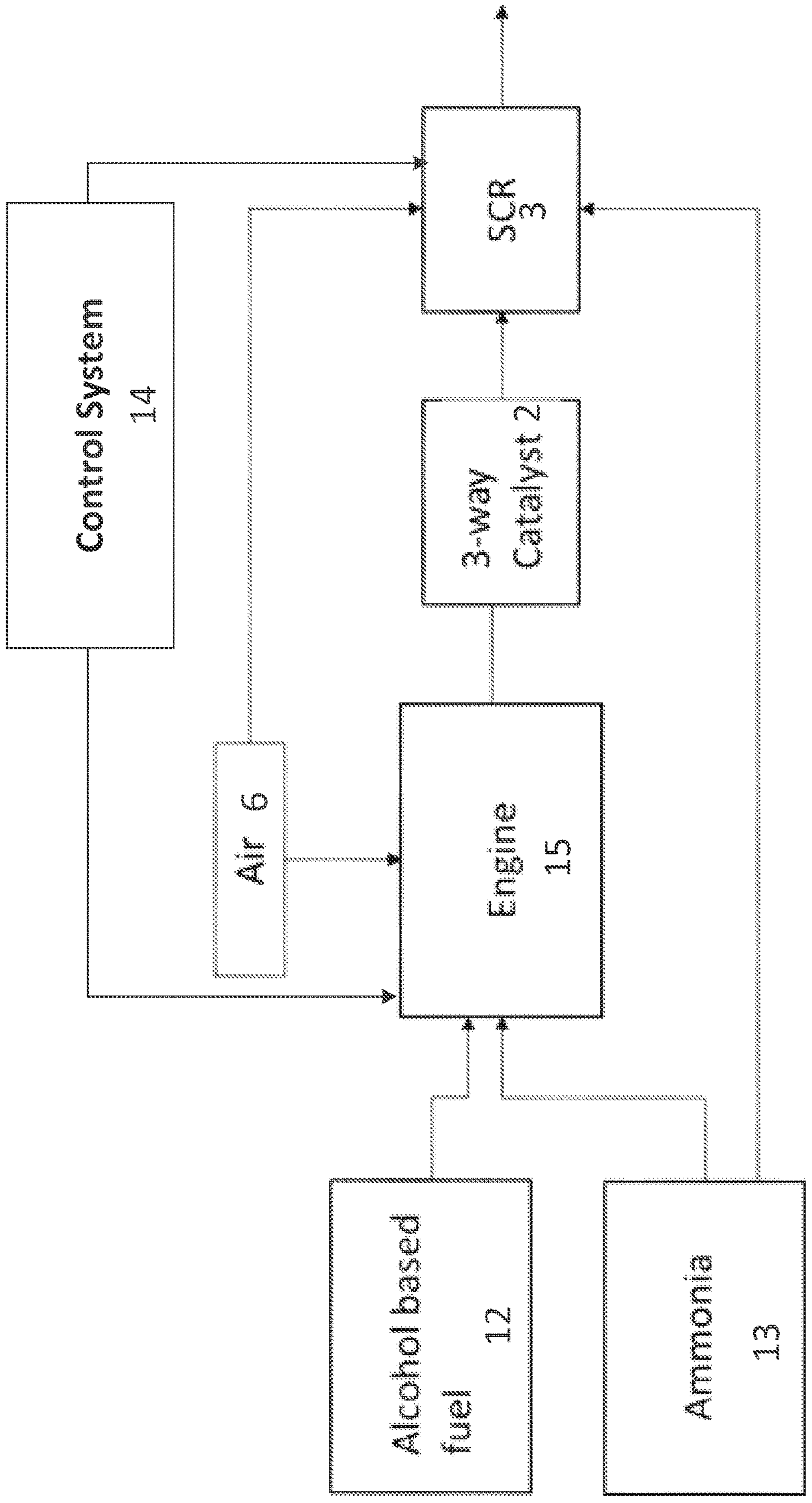
FIG. 6 shows an engine fueled with ammonia and/or alcohol-based fuel with NOx exhaust treatment by a three-way catalyst plus SCR. The ammonia for use in SCR can be provided by the same tank that provides ammonia for the engine.

A system for using alcohol-based fuel 12 in addition to ammonia 13 in an engine 15 is shown in FIG. 6. The control system 14 may also control the use of hydrogen from ammonia cracking from exhaust heat recovery if it is employed (as described in the following section). In one embodiment of the ammonia powered engine 15, alcohol-based fuel 12 addition is used and no exhaust heat recovery and/or hydrogen is used. Another embodiment may include these features. Note that the alcohol-enhanced ammonia engine 15 may utilize the enhanced exhaust treatment system described in Section 1.

The control system 14 may be configured to limit or minimize the amount of alcohol or alcohol-based fuel 12 that is used in bringing the engine 15 to its operating point (the operating speed and torque t of its operating time). This may be accomplished by adjusting the amount of alcohol-based fuel 12 to be substantially equally to meet a varying combustion stability requirement as the engine speed and torque change. This adjustment can be done during all or part or parts of the time that the alcohol-based fuel 12 is being employed.

The alcohol-based fuel 12 may be used to provide adequate flame speed and combustion stability during the period of inadequate temperature during cold start (e.g. during first 100 seconds of engine operation) and during operation at low torque and pressure after engine 15 is warmed up as the engine 15 is brought to an operating point or operating region at which the engine 15 would provide power to a generator. Because of the relatively high temperature, pressure, torque of the operating point or operating region, it may typically have greater combustion stability at a given engine speed than the regions of the engine map that would be passed through to reach an operating point after the engine had started. The operating region may typically be a narrow region around an operating point (e.g., plus or minus 10% around the pressure, torque and speed of an operating point).

The type of control may also be used to limit or minimize the amount of hydrogen that is used for providing adequate flame speed and combustion stability as engine speed and torque change. For example, hydrogen from decomposition of ammonia may not be called for until there is sufficient temperature for adequate operation of the catalyst for ammonia decomposition for exhaust heat based reforming.

The control system 14 may use closed loop control using a misfire detector and/or a knock detector and/or open loop control to adjust the fraction of fuel that comes from the alcohol-based fuel 12. This fraction can be limited or minimized to the fraction needed to prevent misfire (or another means of identification of lack of desired combustion stability) as the engine parameters transition to the desired engine operating point. This limitation or minimization may be used during all or part of the transition from engine start to the engine operating point. In this way, the use of alcohol or alcohol-based fuel 12 during engine operation could be limited for a small fraction of the ammonia fuel 13 (e.g. 2% or less). The limitation to this small fraction can be facilitated by operation of the engine 15 for most of its operating time at operating point or region while being used to produce electricity.

The same control approach for limiting the use of alcohol-based fuel 12 may be applied to limiting use of hydrogen or use of hydrogen plus alcohol-based fuel 12. In these ways, the use of alcohol-based fuel 12 during engine operation may be limited for a small fraction of the ammonia fuel (e.g. 2% or less). The use of the alcohol-based fuel addition can be employed to reduce the required effectiveness of the catalyst used in the exhaust heat reformer in produced hydrogen by cracking the ammonia 13.

The open-loop and closed loop control discussed above could also be used with other liquid automotive fuels (e.g., gasoline, E10 and E30) as an alternative or complement to use of hydrogen or alcohol-based fuels.

In addition to operating at 40 to 70% of the peak engine speed (e.g. 5000 rpm or more) and power for most of the operation time (e.g. more than 70% of the engine operation time during a year), which would typically be at open throttle, the engine 15 may also be operated at its peak engine speed for a limited amount of time. The increase in speed beyond the typical operating speed (e.g. 2500-3600 rpm) may require the addition of ethanol (or ethanol-gasoline mixture) or methanol (or a methanol-gasoline mixture) fuels as speed and/or load increases. Directly injected or open-valve port fuel injection of alcohol-based fuel and/or ammonia may be used in this operating regime.

Prechamber Ignition

The ammonia powered engines 15 may also use ignition provided prechambers to increase flame speed and provide additional by combustion stability. The prechambers may provide a much stronger ignition that a conventional spark plug by injecting hot gas so as to create a relatively large ignition region in an air fuel mixture in the engine cylinders. These prechambers may use ethanol or an ethanol-gasoline mixture or methanol or a methanol-gasoline mixture for enhanced prechamber performance. These alcohol-based fuels 12 may be provided by the same second tank that is used to provide these fuels to the engine cylinders.

The use of a prechamber may employ an ignition system that has a longer lifetime than one that could provide ignition in the cylinder. This could be important for high capacity factor applications of the ammonia powered engines.

Large Cylinder Volume Engines

The approaches described for ammonia engines which are modifications of automotive-derived spark ignition engines may also be used for modification of spark ignition engines or compression ignition engine that have larger cylinder volumes (such as greater than 2 liters per cylinder) and higher engine power levels (such as greater than 1 MW) and which would typically be derived from engines that are used for stationary power. These larger cylinder engines would generally be more adversely affected by the low flame speed of ammonia. For other factors being the same, greater use of an ethanol or methanol-based fuel and/or hydrogen may be needed to provide the same combustion stability at a given engine speed and torque as is the case with a light duty vehicle automotive-derived engine.

Use of a prechamber fueled by an alcohol-based fuel or hydrogen along with the introduction of these fuels when needed into an ammonia fueled engine may be used to provide a sufficiently high flame speed for operation of these larger cylinder volume engines at a desired cylinder speed. Use of a prechamber may be used for spark ignition engines or for conversion of compression ignition diesel engines into ammonia fueled engine which are operated on an Otto cycle.

Modification of Compression Ignition Engines

In the modifications of compression ignition diesel engines to ammonia powered engines, the prechamber may be placed in the location where the diesel fuel injector had been located. Ammonia from an ammonia fuel tank may be introduced into the engine by port fuel injection. Hydrogen and unconverted ammonia from the exhaust heat driven reformer (described below) may also be introduced into the engine by a port fuel injection. Port fuel injection may also be used to introduce an alcohol-based fuel (e.g. ethanol, methanol or a high alcohol concentration mixture such as E 85 or M85) to the hydrogen from exhaust gas reforming could also be used as a fuel for the prechamber. In addition alcohol (or alcohol based fuel) or hydrogen may be used as the fuel for the prechamber.

The use of an alcohol or alcohol-based prechamber and/or fueling of the prechamber by syngas from exhaust heat reforming may also be used for modification of diesel engines to be powered by alcohol or an alcohol-gasoline mixture.

The diesel compression ignition engines that would be modified may be engines that are factory produced or engines that are or have been in use in vehicles or stationary applications.

The modification of compression ignition diesel engines into ammonia and/or alcohol-based fuel powered spark ignition engines using a prechamber may carried out for compression ignition engines with large cylinder volume (such as 2 liter cylinder volumes or greater) and also with other cylinder sizes. The modified compression ignition engine may also use spark plugs for ignition where the spark plugs may be located where the diesel injectors had been located. In this case, the ignition would generally be substantially less powerful than use of a prechamber.

Compression Ignition

As an alternative to a prechamber, ammonia powered engines that are derived from modifications of compression ignition diesel engines could use compression ignition of a relatively small amount of high cetane fuel such as diesel, renewable diesel or DME (dimethyl ether) to provide a high energy ignition source which provide better combustion stability for ammonia engines. These compression ignition fuels may be introduced in the penetration in the engine where the diesel fuel injector had been located. DME may be particularly attractive because it is a cleaner compression ignition fuel.

As an alternative to a separate tank for storing DME, DME may be produced onboard from methanol or a methanol-gasoline mixture that is provided by the same fuel tank as the methanol-based fuel that may be used in varying combinations with ammonia to provide a faster flame speed. A fuel separator may be used to separate the methanol from a methanol-gasoline mixture prior to its conversion into DME and/or its reforming by exhaust gas heating.

The above approaches for using various ignition sources in modifications of diesel compression ignition engines for use as ammonia powered engines may also be employed in engines powered by methanol or methanol-gasoline fuel where ammonia is not used. This could be done in engines powered by methanol-based fuel with or without the use of exhaust heat decomposition of the methanol or methanol-based fuel.

Ultra Low NOx Using Three Way Catalyst+SCR Exhaust Treatment System

As noted above, the ammonia powered engine systems that are discussed above could also be configured so as to reduce NOx to ultra-low levels using SCR (selective catalytic reduction) 3 of the exhaust from the three-way catalyst 2 as shown in FIG. 6. This exhaust from the three-way catalyst 2 may be mixed with the needed amount of air 6 to achieve a desired level of lean operation in the SCR catalyst 3. Ammonia 13 from the ammonia fuel tank, or diesel exhaust fluid may be used for providing the ammonia used for SCR catalyst reduction of NOx in the exhaust that it receives from the three-way catalyst 2. A sensor may be used to determine the desired amount of air 6 that is needed for the desired operation of the SCR 3 based upon measurement of NOx concentration upstream and/or downstream from the SCR catalyst 3, or measuring stored ammonia in the SCR catalyst 3. This sensor may be used by the control system 14 to determine the required amount of additional air and the rate of injection upstream of the SCR 3 of the diesel exhaust fluid, or ammonia that may be employed for operation of the SCR 3. The SCR 3 reduces the NOx to ultra-low levels (at least five times lower than the NOx level from the exhaust from the three way catalyst). In one embodiment, the ammonia used for operation of the SCR 3 may be supplied from the ammonia fuel tank that fuels the engine. In the case of ammonia powered engines that are modifications of compression ignition diesel engines that have been used in vehicular or in stationary application together with SCR catalysts for exhaust treatment, these SCR systems may also be together with the ammonia powered engines.

Fuel-Flexible Operation

The ammonia powered engines described above may be configured to also operate on fuels that include but are not limited to natural gas, biogas, hydrogen, propane, alcohol based fuels (ethanol, methanol or their mixtures with gasoline) and/or DME by themselves or in mixtures between them or with ammonia or ammonia reformate (ammonia, nitrogen and hydrogen). These fuel-flexible engines may use stoichiometric fuel/air ratio operation along with three way catalyst for exhaust treatment. They may also use a three-way catalyst plus SCR exhaust treatment system for obtaining ultra-low NOx emissions. The use of exhaust heat recovery using exhaust heat recovery may be bypassed when fuels other than ammonia and alcohol-based fuels are employed. There may be capability for switching between two different reformer catalysts depending on whether the engine is powered by ammonia or by an alcohol based fuel.

An illustrative fuel-flexible engine powered by ammonia and/or M85 is described below in the subsection on illustrative engine powered generator systems.

Illustrative Engine Powered Generator Systems

An illustrative embodiment for an alcohol enhanced ammonia engine powered generator system may use E85 as the alcohol-based fuel. E85 could provide the advantage of a presently certified fuel in the U.S. and has a carbon intensity that is up to around 30% lower than gasoline. E85 is presently produced from corn in the U.S. In the future, ethanol with substantially lower carbon intensity may be produced from syngas that is provided by gasification of municipal solid waste, agricultural waste, forestry waste, other wastes and/or specialty biomass.

The engine may be started completely or mainly of E85 to provide sufficiently low cold start emissions Introduction of E85 which may provide varying fractions of the fueling may be used as a means to provide sufficient combustion stability as the engine is brought to its operating point or region for electricity generation (or moved away from its operating point or region for temporary increased power). The fraction of fueling provided by E85 as engine temperature, speed and torque are varied may be controlled by the control system so as to provide adequate combustion stability and prevent knock. E85 use may be limited or minimized by the control system. The control system may limit the E85 use over an engine operating time to a small fraction of the ammonia use (such as less than 2% and preferably less than 1%).

One option for design of ammonia powered engine may be for operation without the addition of hydrogen from a exhaust heat decomposition of ammonia. Another option is to use exhaust heat decomposition and the hydrogen that it provides in the engine. Embodiments for control of ammonia exhaust heat recovery that are described in Section 3 may be employed.

This engine may be used as part of an engine powered generator system. The engine powered generator system may employ one or multiple engines. The multiplexed engines may be located in a truck hauled container trailer that provides at least 3 MW of electrical power. The engines and generators would be operated at varying speeds and the generators would produce DC power. As described above, the engine may be a modified automotive engine that is derived from a light duty vehicle or a heavy duty vehicle spark ignition engine that is operated with a stoichiometric fuel/air operation It may also be an engine that is derived from a large spark ignition engine that is used for stationary power. The engine may also be an engine that is derived from modification of a diesel compression ignition engine. The modification of a diesel compression ignition engine could use a prechamber or compression ignition of a high cetane fuel such as DME. The engines and generators would be operated at varying speeds and the generators would produce DC power. As described above, the engine powered generators may use a three way catalyst plus SCR exhaust treatment system for reducing NOx emissions to ultra low levels. Another illustrative example is the use of M85 to provide the same advantages as the illustrative example for E85. Use of methanol could have the additional advantage of providing a means to produce DME for compression ignition of ammonia and ammonia plus methanol-based fuel mixtures.

Methanol may also provide the future advantage of being a larger and more efficient source of low-carbon fuel than ethanol (by production of methanol from gasification of a wide range of wastes and biomass using renewable electricity and also be production from CO2 and hydrogen). Using this low-carbon fuel, fuel flexible engine powered generators using ammonia and methanol-based fuel (methanol or methanol-gasoline mixtures such as M85) may operate in a flexible fuel mode where the engine may operate over a wide range of combinations of ammonia and methanol based fuel ranging from 100% methanol-based fuel to near 100% ammonia (where a small amount of methanol-based fuel is needed for combustion stability when the engine is operated for small fraction of its time at parameters different from the operating region). This use of two liquid hydrogen carriers could provide important flexibility in use of the various means of producing them.

The illustrative fuel-flexible ammonia and/or M85 powered engine described above can also have the capability to be operated with one or more presently available fuels. These include natural gas, corn-based ethanol, propane, gasoline and gasoline-ethanol mixtures such as E85.

Applications of Ammonia+Alcohol-Based Fuel Powered Engines

The various embodiments of ammonia+alcohol based fuel powered engines disclosed herein may be employed in a wide range of applications. One application is electricity generation for grid electricity, including but not limited to use of multiple engines power generators in a power module unit to be used for grid load balancing and grid energy storage. Other grid power applications include but are not limited to data center, water treatment facilities, medical facilities, semi-conductor manufacturing plant back up power. They could also be used for electric vehicle battery fast charging.

An additional use of the ammonia+alcohol based fuel powered engines for electricity generation may be for energy storage from electricity produced at wind turbine systems. The ammonia+alcohol based fuel powered engines could provide the capability for the wind turbine installation to provide predicable and controllable levels of low carbon electricity for the use by grids or other applications. For offshore systems, wind turbine ammonia production, storage and conversion into electricity for providing the controllable levels of output electricity from the variable wind energy source could be located near the offshore wind farm on floating platforms.

The ammonia+alcohol based fuel powered engines or ammonia+alcohol based fuel powered engine generator features discussed above could also be used in vehicles that include off-road vehicles and heavy duty trucks. They may also be used for marine propulsion.

III. Control Systems for Alcohol and Ammonia Reformer Energy Recovery from Spark Ignition Engines As noted above, endothermic exhaust heat reforming of a fuel that is employed in reciprocating engines can be utilized to significantly increase overall engine efficiency. These fuels include alcohols (methanol or ethanol) or alcohol-based fuel such as alcohol-gasoline mixtures), ammonia or others. The exhaust heat is used in an endothermic reaction to convert the fuel into a hydrogen-rich gas which has more chemical energy than the pre-reformed fuel. In the case of an alcohol or an alcohol-gasoline mixture, the fuel is converted into syngas, a mixture of hydrogen and CO. The hydrogen-rich gas is then combusted in the engine. The engine can be an engine in a vehicle or a stationary power engine.

This open Rankine cycle exhaust heat recovery generally works best in engines with a stoichiometric fuel-air ratio because of relatively high exhaust temperatures. A three-way catalyst, the operation of which is enabled by use of a stoichiometric fuel-air ratio, is used for exhaust emissions reduction. A control system is needed to manage the operation of this energy recovery system under changing conditions.

Dissociation of Alcohol or Ammonia

Figure 7:
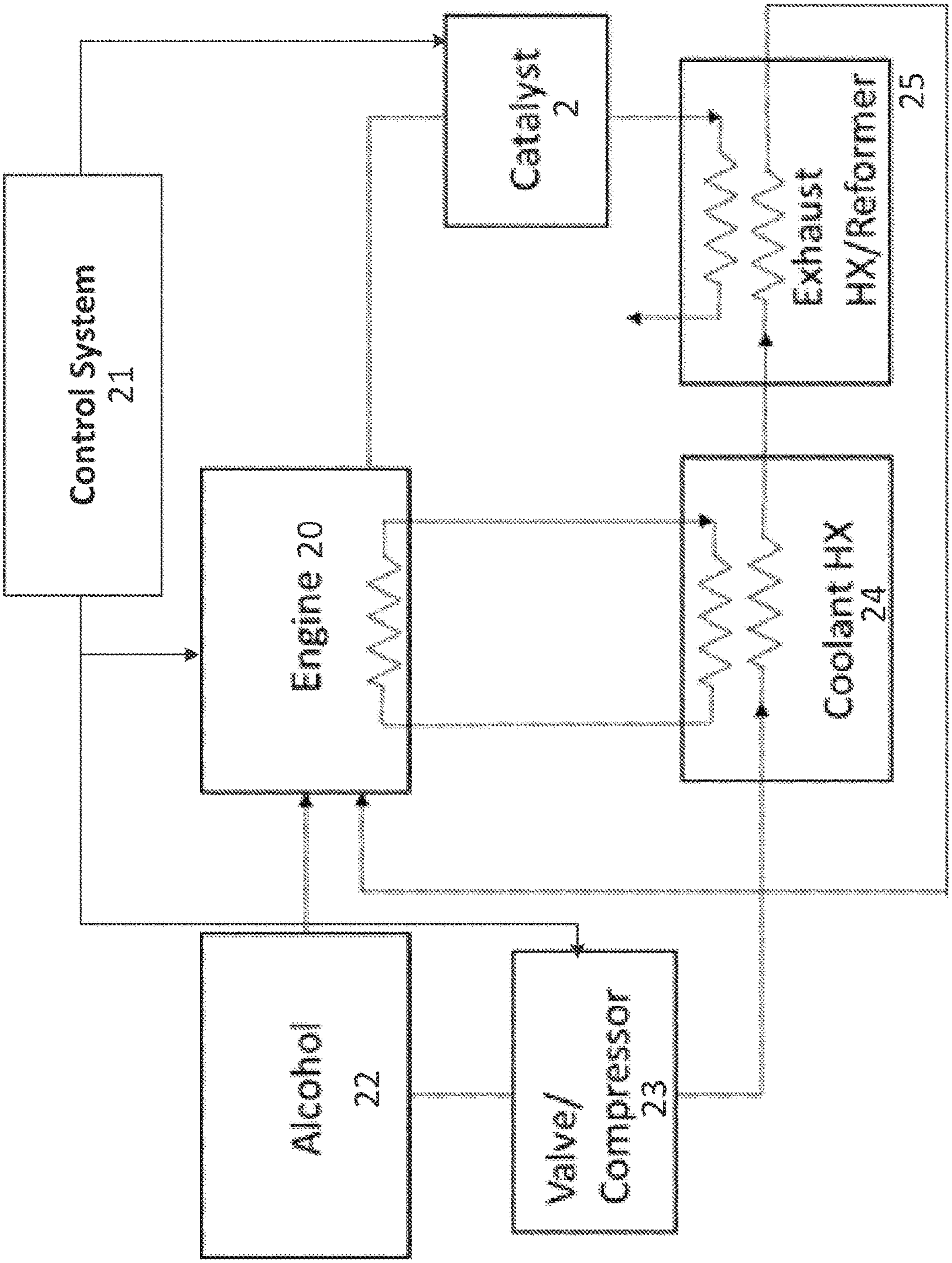
FIG. 7 shows a system where syngas (also referred to as "hydrogen rich gas") from the exhaust heat reformer is introduced into the engine at high pressure after the engine inlet valve has closed.

FIG. 7 shows an illustrative system for alcohol dissociation. Features of this system can also be applicable for ammonia. As shown in FIG. 7, alcohol 22 (methanol or ethanol) or alcohol-gasoline mixture may be directly sent to the engine 20 and/or sent through a heat exchanger (HX) 24 and dissociated by a reformer 25 into syngas which is then introduced into the engine 20. In some embodiments, the alcohol 22 from an alcohol-gasoline mixture can be separated from the mixture prior to its introduction into the reformer 25.

Figure 8:
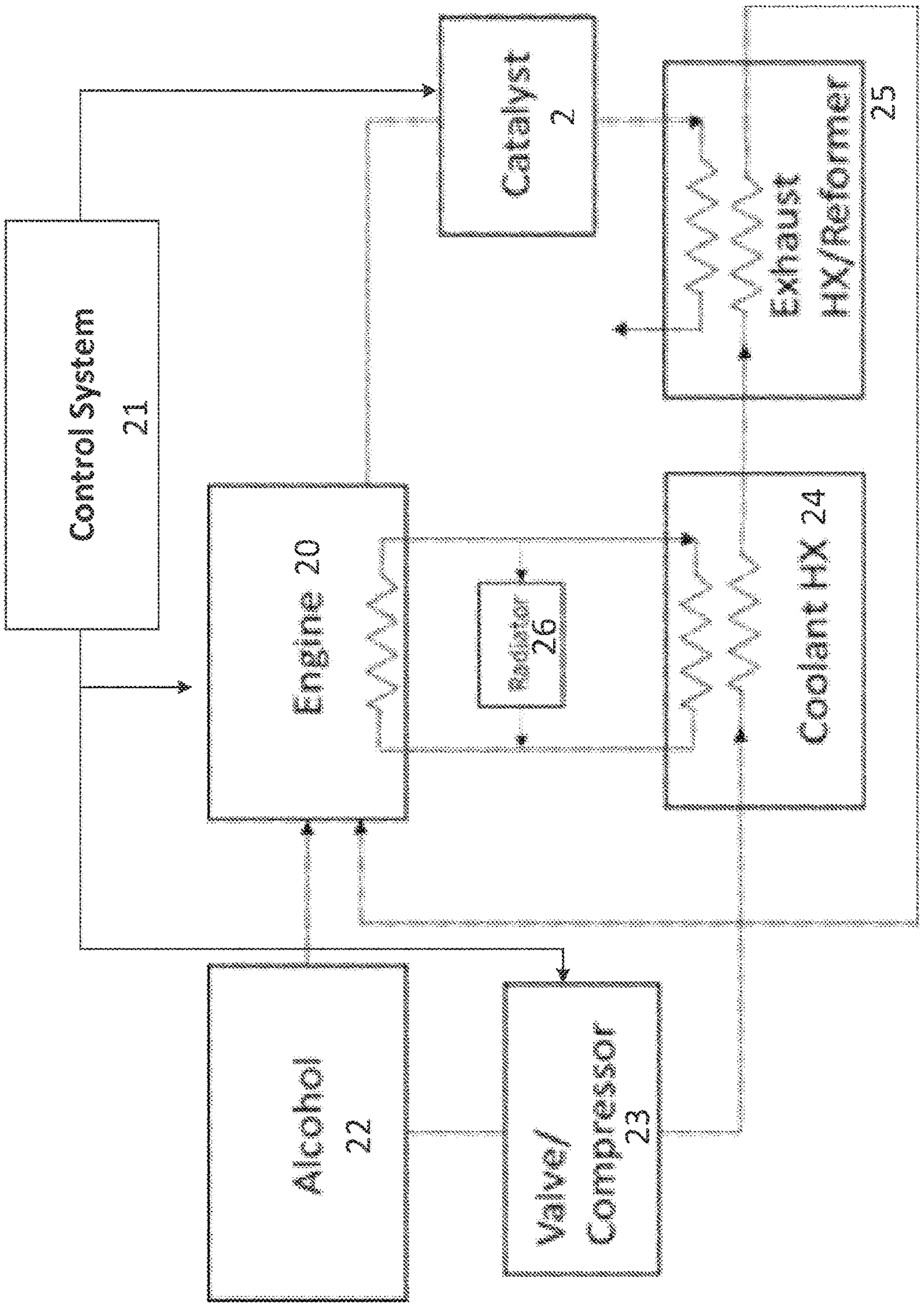
FIG. 8 shows a system where syngas (hydrogen rich gas) from an exhaust heat reformer is introduced into the engine at high pressure after inlet valve has closed. A radiator is used to adjust the temperature of the Coolant HX (heat exchanger) and the temperature of the engine.

The control system 21 determines the relative amounts of alcohol 22 or alcohol-gasoline mixture that flows through these two pathways. The control system 21 looks at the present status of the engine 20. The inputs to the control system 21 can include engine speed and load (torque); temperature (engine, coolant and ambient temperature); knock (through knock sensor or rate of pressure rise in the cylinder); inlet manifold pressure; and valve timing. The control system 21 then decides how much of the alcohol 22 should go through the HX 24 and reformer 25. The control system 21 also determines whether the engine coolant goes through a radiator 26 (as shown in FIG. 8) between the coolant HX 24 and the engine 20 in the return of the coolant to the engine 20, when the engine temperature is increasing as the coolant HX 24 is not providing sufficient cooling. This coolant flow bypass can be controlled by a proportional valve or an open/shut valve, operating in a pulse-width modulation mode.

Although they are shown separately in FIG. 7, the catalyst 2 used for exhaust treatment can be incorporated into the exhaust HX reformer 25. The Exhaust HX reformer 25 may have two separate loops, with different catalysts: the first loop is for treating the exhaust, such as a three-way catalyst; and a second loop on the flow path of the alcohol flow path for dissociating/reforming the fuel (alcohol, ammonia).

The engine 20 and the fuel system need to warm up. During early warm up, the control system 21 does not allow fuel to flow through the coolant HX 24, as the temperatures are too low for reforming. At the same time, the exhaust warms the three-way catalyst 2 and the exhaust HX/reformer 25. When the exhaust HX 25 is warmed up to above a certain temperature (for example, 200 C for methanol) and the engine coolant HX 24 is warmed up sufficiently to vaporize the pressurized alcohol, the alcohol valve opens above this specified temperature (which can be different for methanol, ethanol and ammonia). Once the coolant HX 24 is warmed up (to temperature above the evaporating temperature of the alcohol), the alcohol valve/compressor 23 engages and drives alcohol 22 through the both the coolant HX 24 (the coolant to liquid alcohol HX) and the exhaust HX 25 (heat to vaporous alcohol HX), reforming the alcohol at high pressure.

Figure 9:
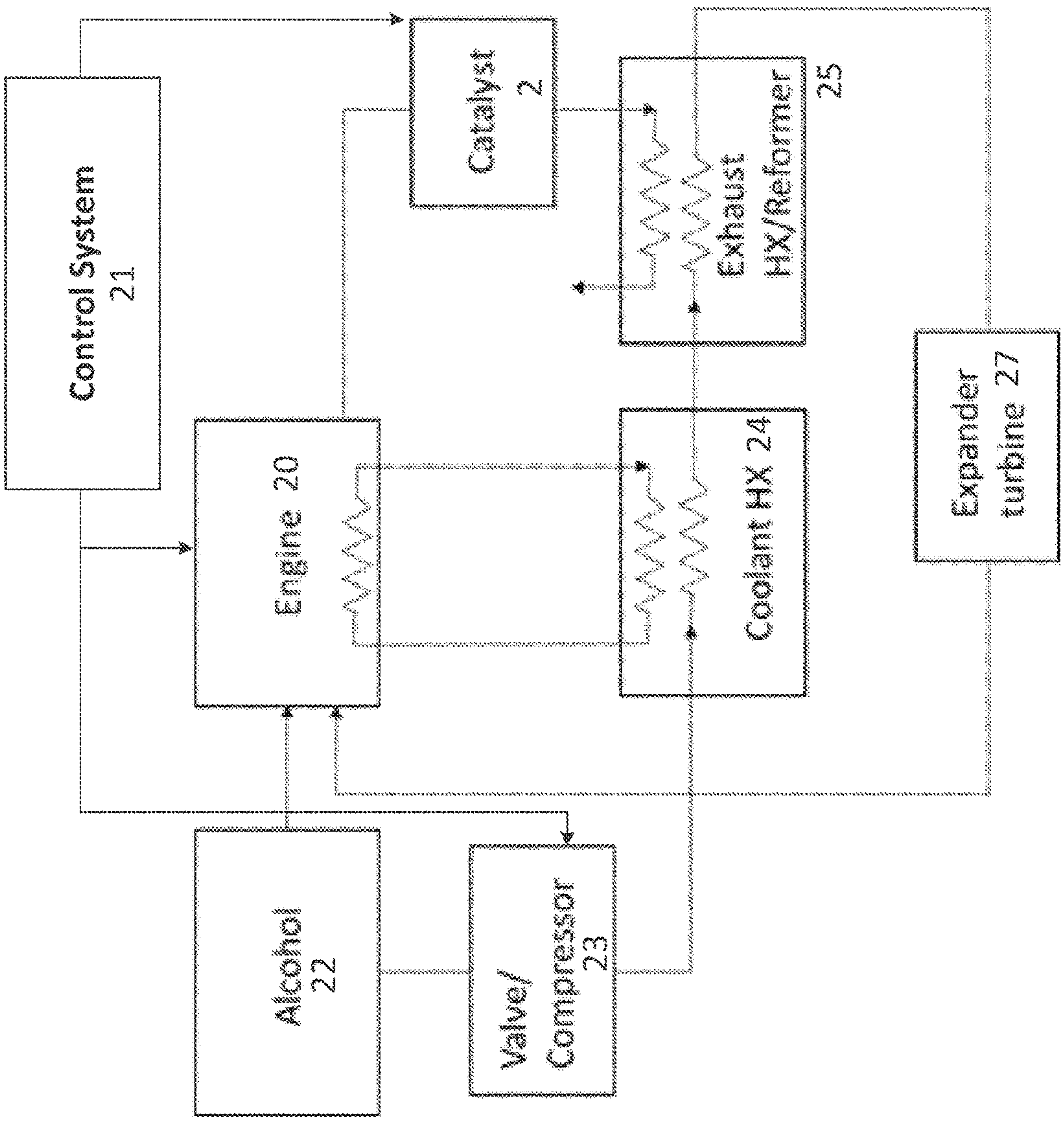
FIG. 9 shows a system where syngas introduced into the engine at high pressure through the inlet manifold, using an expander/turbine to provide power.
Figure 10:
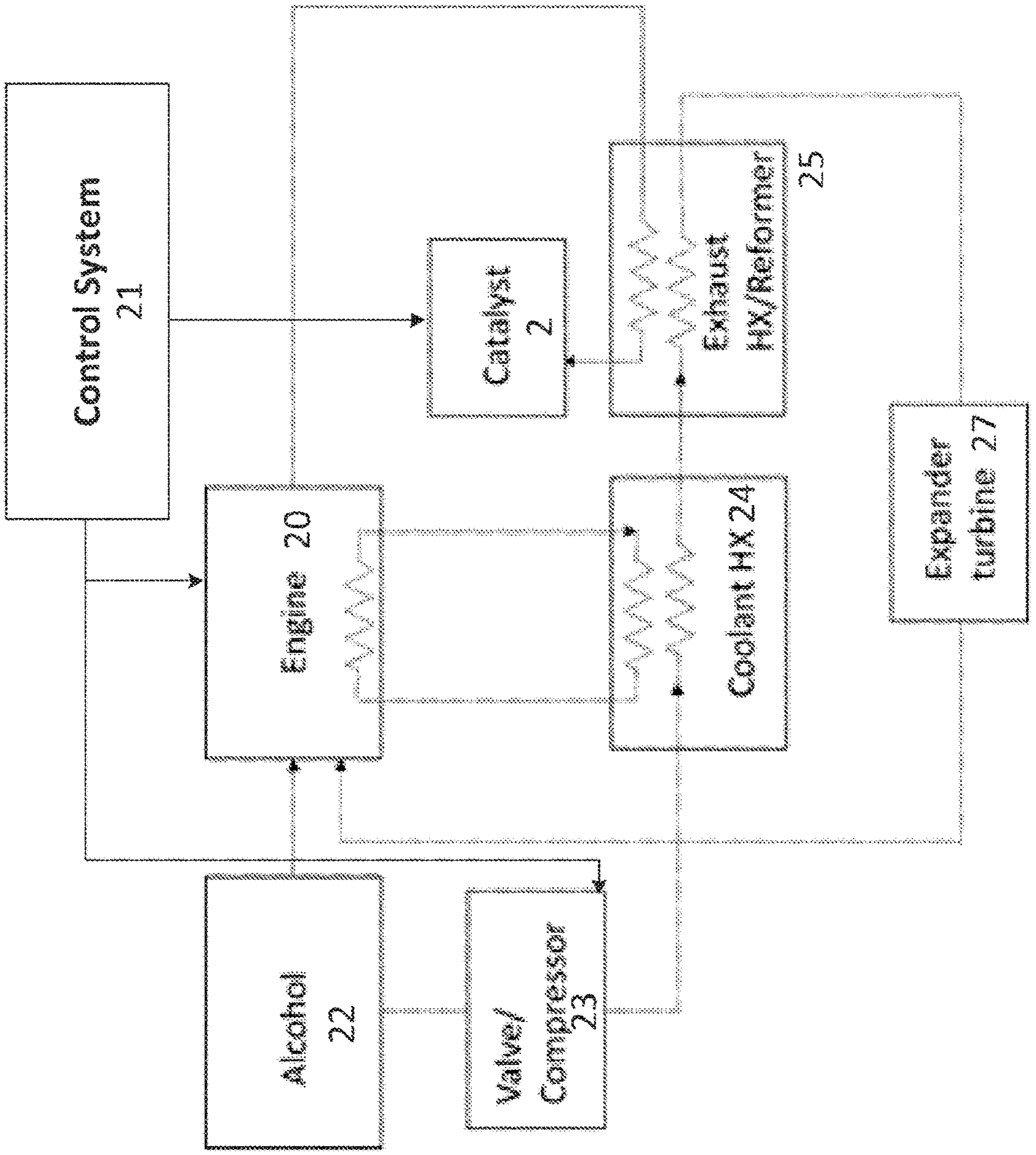
FIG. 10 shows a system similar to FIG. 9, but hot engine exhaust is first routed to the exhaust HX/reformer, and then to the aftertreatment catalyst.

The high pressure syngas that is produced by reforming of the alcohol or alcohol-gasoline mixture is expanded either in the expander/turbine 27 (generating work), or injected at pressure through a valve into the cylinder after the inlet valve has closed, using the engine 20 to combust the syngas gas as shown in FIGS. 9 and 10. A similar system may be used for hydrogen produced from ammonia decomposition. When the turbine 27 is employed, it may be used to provide mechanical power and/or electricity. The electricity that is produced may be used to power auxiliary systems in a vehicle and/or to power electric propulsion motors in a hybrid vehicle. It may be sent to a battery which then provides electricity for these functions. Alternatively, the electricity that is generated from the turbine 27 may be added to electricity that is produced by an engine-generator unit that is used for stationary electricity production.

Figure 11:
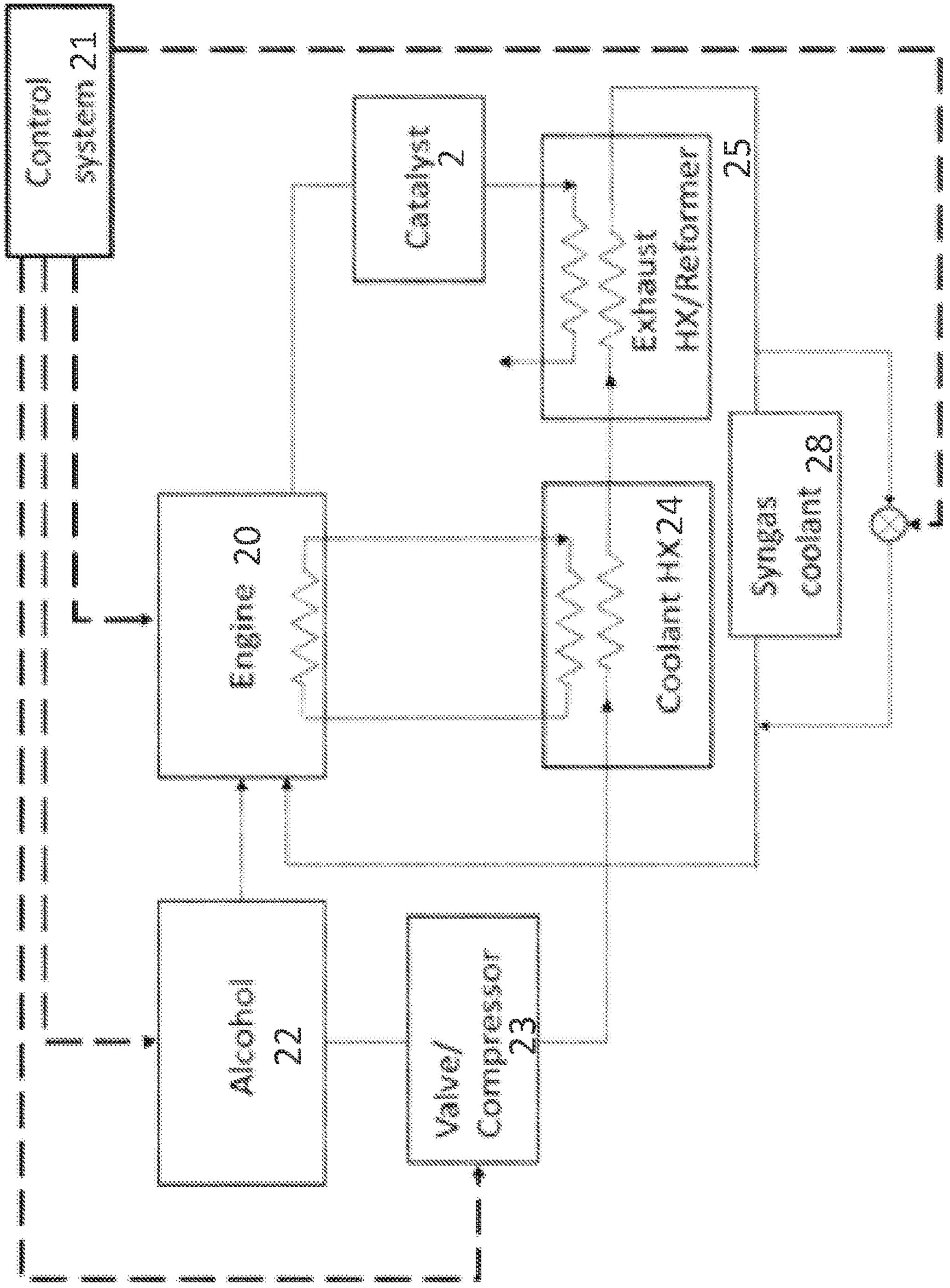
FIG. 11 shows a control system for determining split between alcohol sent to the engine and to the reformer and for cooling the syngas.

As shown in FIG. 11, the control system determines the alcohol or alcohol-gasoline mixture fuel flow split between the engine 20 and the reformer 25 depending on parameters that include engine speed, load, coolant temperature, exhaust temperature and engine power level. The syngas (which can also be referred to as "hydrogen rich gas") from the reformer 25 is introduced into the engine at high temperature. In one case, the hydrogen-rich gas is injected at high pressure through a valve, when the engine inlet valve has closed and the cylinder pressure has started to rise because of compression. In this case, the compression work from the engine is reduced and the engine can generate additional power.

Because of the high temperature of the hydrogen rich gas, the engine tendency to knock increases. The control system may use of information a knock sensor or pressure sensors inside the cylinder. If knock is detected, a higher fraction of the alcohol may be needed to be directly sent to the engine in order to prevent knock. Open loop control based on predetermined information about knock can also be employed. The control system 21 determines (either from a lookout table or from sensors) the ratio of alcohol to be introduced into Coolant HX (and reformer apparatus) to the alcohol that is introduced directly into the engine.

Figure 12:
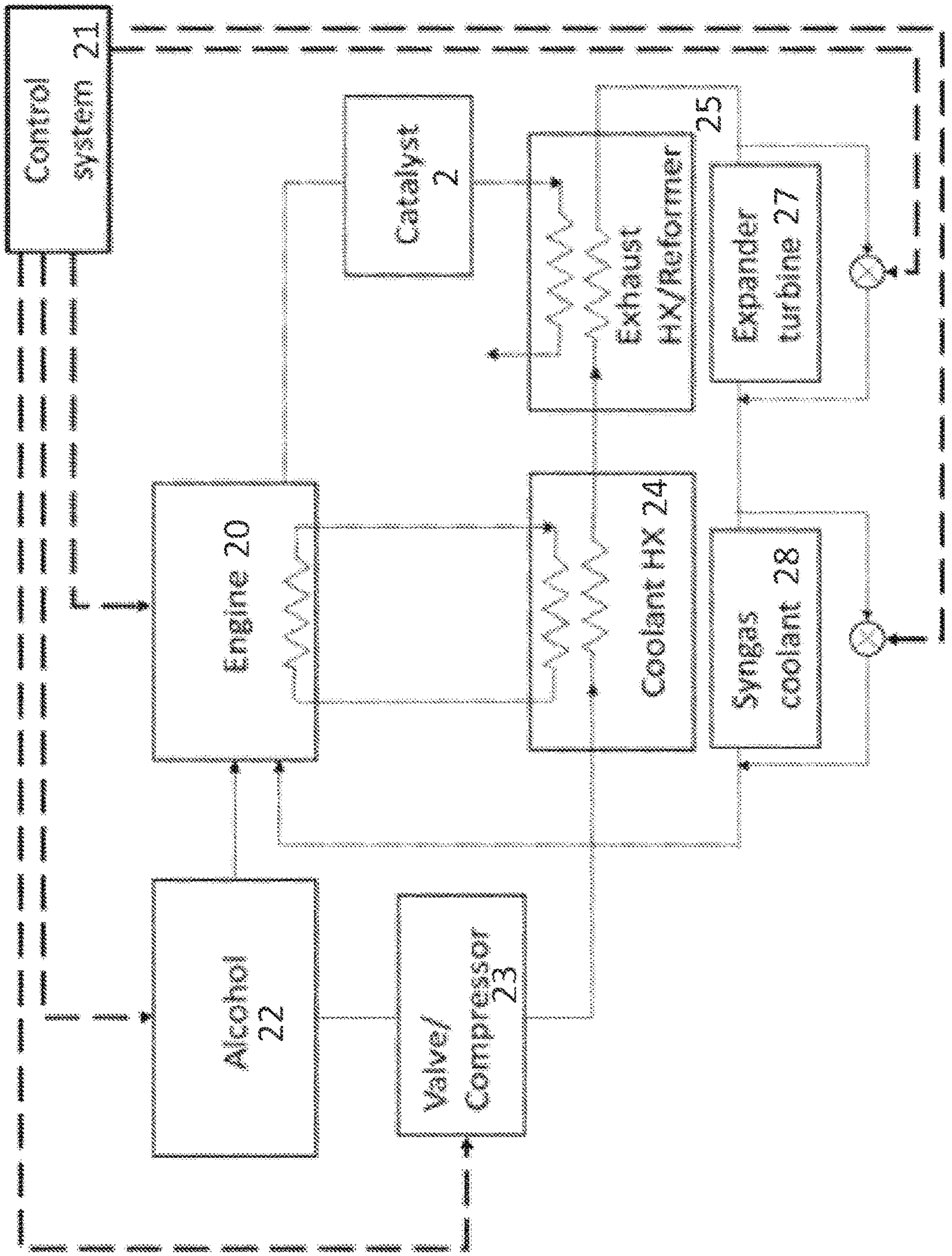
FIG. 12 shows a control system for an alcohol or alcohol-gasoline powered engine with open Rankine cycle heat energy recovery including a syngas cooler downstream from the expander turbine.

It may be possible to cool the hydrogen rich gas downstream from the reformer 25 but upstream from the engine 20. One approach is shown in FIG. 11. Similar to an intercooler, the syngas cooler 28 decreases the temperature of the syngas and decreases the knocking tendency of the engine 20. Depending on system conditions, the control system 21 determines whether the hydrogen rich gas flow bypasses the syngas cooler 28. Lowering the temperature of the syngas and the cylinder charge results in decreased requirement for introduction of the alcohol 22 to the engine. The alcohol 22 may be introduced into the engine 20 either through port fuel injection or a direct fuel injection. Open-valve port injection (which provides vaporization cooling inside the cylinders) may be used to improve knock suppression relative to use of conventional closed-valve injection. Cooling of the hydrogen rich fuel may be advantageous for eliminating knock. In the case of an expander turbine 27 for expanding the hydrogen rich gas, the syngas cooler 28 as shown in FIG. 12, would be downstream from the expander turbine 27.

In an embodiment where engine operation is limited by the onset of knock, the relative amounts of the fuel that is directly sent to the engine and fuel that sent to the reformer 25 are adjusted in order to prevent knock. The controls shown in FIG. 10 may be used. The engine operating conditions (speed, load, spark retard, EGR, valve timing) are adjusted for a given amount of fuel through the dissociating reactor and a given amount of cooling of the hydrogen rich gas, downstream from the expander, if one is used. Spark retard, EGR and other engine operating conditions decrease the engine efficiency and result in increased enthalpy of the exhaust gas and increased temperature. The control system 21 determines the overall efficiency of the system, and in some cases, the efficiency loss due to spark retard and other engine control options is more than made up by the increased efficiency due to the endothermic reformation and energy recovery in the expanding turbine (if an expanding turbine is used).

One option for the prevention of knock is the use of direct injection of a fraction of the fuel into the cylinder while the remaining fuel is sent to the reformer 25. In this case both the higher fuel octane and evaporative cooling can be used to prevent knock. This fraction of the fuel that is directly injected can be limited to that required to limit knock, and can be traded-off by use of spark retard and other means for avoiding knock. The control system 21 changes the operating conditions of the system (engine, amount of the fuel through the dissociating reactor, amount of post turbine cooling, in order to result in the higher possible efficiency at the demanded power. In this manner, the system efficiency may be increased and the engine operating condition can be away from its most efficient point (which corresponds to maximum-break torque).

In an embodiment for the situations where engine operation is not knock limited, at high levels of engine power, a large fraction of the alcohol 22 is circulated through the HX 24 and reformed into synthesis gas, depending on the temperature of the different components, because of the higher temperatures and higher exhaust enthalpies available at the higher power. At low power, a smaller fraction is circulated. At the lowest power, minimal fraction, if any, is circulated through the HX's, because of the low temperature of the components. Effective heat recovery is most effective at mid and high power levels.

The control system 21 may also be configured to use engine upspeeding (changing the gear ratio of the engine to a transmission system to wheels of a vehicle or to an electricity generator so as to provide the same engine power at greater rpm and lower torque). Operation at lower torque reduces the propensity to knock. Upspeeding may thus be used to reduce the fraction of alcohol fuel that is sent directly to the engine for knock control and to increase fraction that is reformed, thereby increasing the amount of exhaust energy recovery and the efficiency increase from exhaust energy recovery. This type of configuration may also be used for an ammonia powered engine.

For alcohol that is mixed with gasoline (or example, M85 or E85), a fuel separator may be used to separate the gasoline from the mixture so as improve the performance of the reformer. The gasoline may then be sent directly to the engine.

Additionally, it may be possible to use the alcohol to cool the intercooler that is used to cool the air downstream from the pressure booster (turbocharger or supercharger), further optimizing the thermal waste heat recovery and the performance of the engine (decreasing the knock tendency of the engine as well as increasing the volumetric efficiency of the engine).

At the higher power, the alcohol is used to cool the intercooler, the engine coolant and the exhaust, recovering a substantial fraction of the waste heat energy of the system.

The control system features described above may be used with both mobile and stationary reciprocating engines that are powered by alcohol. The alcohol could be ethanol or methanol or mixtures of these alcohols. These control system features could also be used with gas turbines.

Ammonia

Another application of the exhaust energy recovery system features that are described above may be its use with ammonia powered reciprocating engines or turbines. Ammonia undergoes a endothermic conversion to hydrogen and nitrogen; it involves a greater absorption of heat (endothermicity) than ethanol or methanol (as a fraction of the heating value of the fuel). Ammonia exhaust heat recovery and operation of ammonia engines may be more challenging than ethanol and methanol fueled engines in a number of ways. In addition to involving a greater absorption of heat (endothermicity) than ethanol or methanol, ammonia decomposition also requires a higher temperature. Moreover, ammonia has slow combustion, making the requirement for stable combustion an important constraint when an engine is operated with ammonia alone.

The ammonia may be stored in a high pressure tank, or it may be stored by sub-cooling the ammonia. When stored in a high pressure tank, it is simpler to provide the ammonia at pressure to operate the open Rankine cycle heat recovery system.

Alternatively, it is possible to pressurize liquid ammonia (starting at ~8 bar pressure at 20 C) if the ammonia decomposition (which can also be referred to as "cracking") system is to operate at higher pressure. For best performance of the reformation, high exhaust temperature is desired. The enthalpy of the exhaust gas needs to have sufficient energy for decomposing a substantial fraction of the ammonia. Since ammonia decomposition requires higher temperature than ethanol or methanol, increased exhaust temperature is required. Exhaust temperatures above 700 C may be required if the reaction is carried out to completion, with the minimum operating temperature of the decomposition reactor at 400 C. It should be noted that it may not be necessary to decompose all the fuel, but only a fraction of the fuel.

A preferred embodiment can be a spark ignition engine operated with a stoichiometric fuel air ratio and with a three-way catalyst for exhaust pollutant emissions reduction. The operation with a stoichiometric fuel/air a ratio provides higher exhaust temperature than lean operation, thereby enhancing the endothermic decomposition of ammonia to nitrogen and hydrogen. This increases the amount of exhaust heat energy that is recovered and the amount of hydrogen that is produced. The hydrogen that is produced is then introduced into the engine and increases flame speed and combustion stability, thereby increasing the operation range for the ammonia engine (for example, allowing higher engine speed without misfire). Alternatively, the hydrogen rich gas from ammonia decomposition may be expanded in a turbine to generate power, similar to the process shown in FIG. 9 for alcohols.

Figure 13:
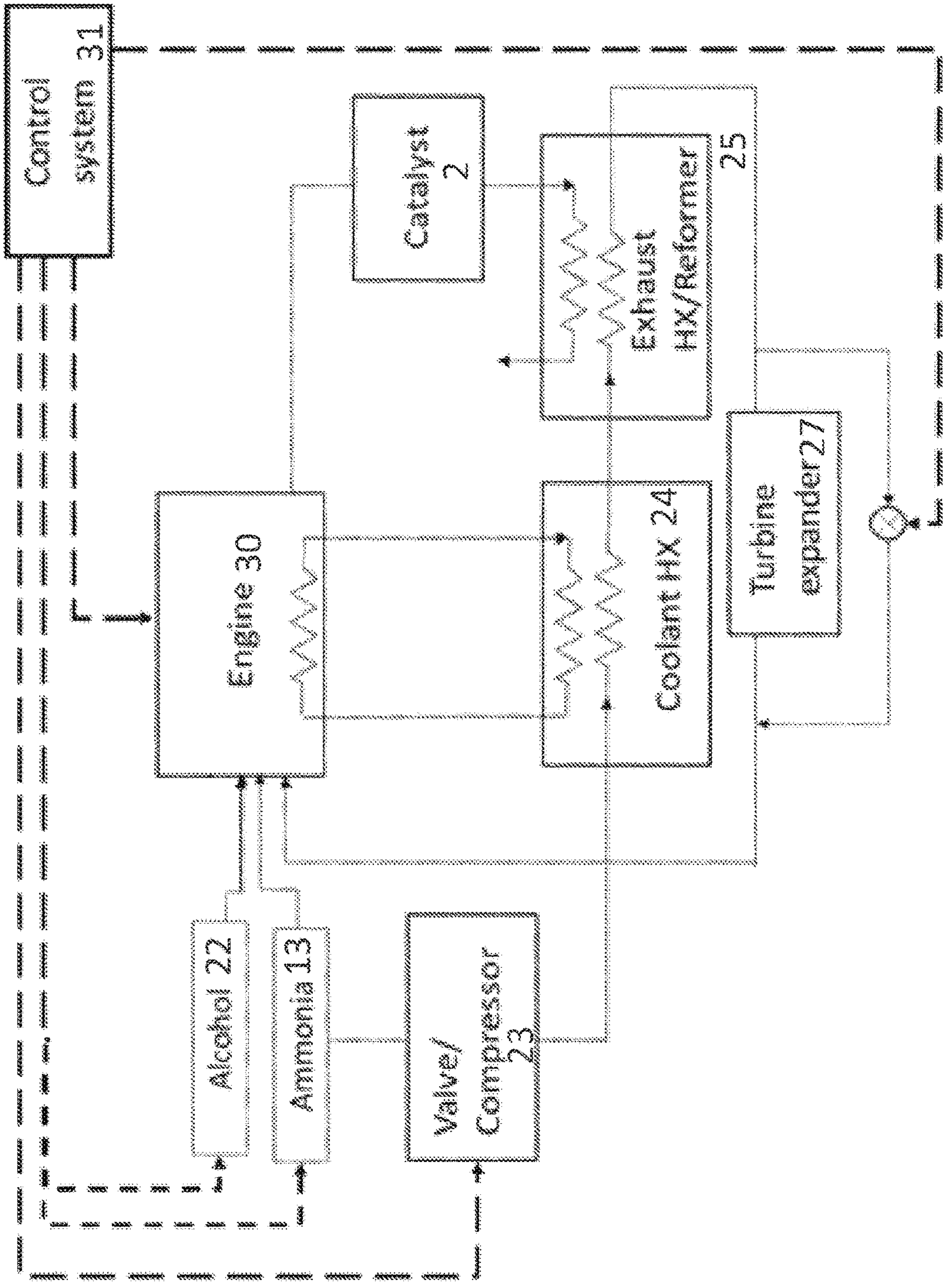
FIG. 13 shows a control system for an ammonia powered engine with injection of an alcohol-based fuel for control of misfire and/or knock.

FIG. 13 shows a schematic diagram of control of a spark ignition alcohol engine with Open Rankine cycle heat energy recovery. The spark ignition engine 30 is operated with a stoichiometric or substantially stoichiometric fuel/air ratio and uses a three-way catalyst 2. The control system 31 determines when and how much alcohol-based fuel 22 should be introduced into the engine 30 as engine parameters change. It may use at least one of closed loop control using a misfire detector and/or a knock detector or open loop control using predetermined information. A heat energy recovery system may also be employed. The heat energy recovery system may use a heat exchanger (HX) 24 to recover heat from the engine coolant and a second heat exchanger to recover energy from the engine exhaust. This second heat exchanger may be integrated into a reformer 25. The reformer 25 decomposes at least some of the ammonia into hydrogen and nitrogen. The hydrogen and nitrogen may also be introduced into the engine. They may first pass through a turbine. The engine exhaust may first pass through one or more exhaust treatment catalysts. In one embodiment, only a three-way catalyst 2 is used for exhaust treatment. In another embodiment, both a three-way catalyst exhaust treatment and an SCR catalyst are used. This type of system may be used with an ammonia powered engine.

As is the case with the alcohol engines shown here and in the previous figures, the ammonia 13 may be split into a stream that goes directly to the engine 30 and a stream that goes to the exhaust heat reformer 25 that converts that ammonia 13 into hydrogen and nitrogen. The hydrogen and nitrogen can both be sent into the engine 30 for hydrogen combustion along with the ammonia 13. Alternatively the nitrogen may be separated out (and could be used for producing ammonia from another source of hydrogen).

The relative amounts of ammonia 13 that are send to the engine 30 and to the reformer 25 (which may be referred to as the "heat energy recovery reformer," "energy recovery reformer" or the "dissociation reformer") are controlled by information from a knock detector and a misfire detector. The misfire detector may be used to call for more ammonia 13 being sent to the reformer 25 for more hydrogen. It may also call for engine speed to be limited since combustion stability decreases with increasing engine speed. One mode of operation is to increase the engine speed up to a speed (or an engine power) above which an unacceptable lack of combustion stability as indicated by misfire is detected. This may be used to operate with the maximum amount of engine power allowed by a combustion stability requirement. The knock detector may be used to adjust the split of ammonia 13 between direct introduction to the engine 30 and introduction to the reformer 25 so as to avoid knock. In addition, the knock sensor information may be used to determining the split between injection into the engine manifold (port fuel injection) as well as direct injection into the cylinder of the undissociated fuel (ammonia or alcohols). It may also be used to adjust engine torque and speed. The combined use of the knock detector and the misfire detector for adjusting engine speed, torque and/or power may be used to enable operation of the engine at a higher power level than would be possible without this control feature, with no or reduced need for spark retard.

Depending on the exhaust temperature and the availability of waste heat, a certain fraction of the fuel (alcohol, ammonia) may be dissociated. In this case, only a fraction of the fuel that goes through the dissociating reformer would be dissociated, because the available enthalpy or temperature of the exhaust is not sufficient. However, the unconverted fuel still goes through the expanding turbine and participates in energy recovery, even if it is not dissociated. Alternatively, a fraction of the fuel may bypass the dissociating reactor and be introduced directly into the engine or into the manifold.

In the case of ammonia, the hydrogen generated through the dissociation of a fraction of the fuel may be used for improving the combustion of the rest of the ammonia in the cylinder. Also, in the case of ammonia, the high temperature of the dissociated gases may be used for improving the combustion of the fuel that is not dissociated. Use of preheated fuels (including preheated hydrogen) and/or air may be employed to avoid misfire and decrease the cycle-to-cycle variability (measured as the coefficient of variation of indicated mean equivalent pressure).

One application of the ammonia engine systems discussed herein is to power one or a set of engine-powered generators that are used for producing electricity from ammonia in an energy storage system, where the ammonia is produced by excess electricity from a grid that is powered by variable renewable electricity. This ammonia may be stored and then used to fuel the engine generators to supply electricity when there is an electricity supply shortfall.

One embodiment of these engine powered generators includes multiple engine generators powered by modified spark ignition automotive engines. Automotive engines, especially engines used light duty vehicles or engines for medium and heavy-duty vehicles are attractive for reasons that include low specific cost (cost/hp), stoichiometric operation (that enables three-way catalysts), rapid response and fuel flexibility.

In addition, use of multiple engine powered generators that employ modified automotive engines as an alternative to a single large reciprocating engine with large pistons allows use of smaller piston size (e.g. less than 1000 cc) to provide the same power as a single large reciprocating engine (e.g. the engines used for stationary electric power. This provides greater combustion stability than large reciprocating engine since combustion stability increases with decreasing piston size. The greater combustion stability of the smaller piston engines may allow engine operation in regions of an engine map (e.g. higher engine speeds) than would be not be allowed in the large reciprocating engine.

As mentioned earlier, an example of the use of multiple modified automotive engines for producing electric power from ammonia is use of these engines in engine powered generator units that are located in a readily transportable container power module which can be hauled by truck (e.g. in 53 foot long truck hauled container on wheels) to a generation site. Each container power module can provide maximum electric power levels in the 3 to 6 MW range. Electricity generating systems of the desired total power may be obtained by the number of power modules that are used. In this way, ammonia powered electricity generating systems in an range of 10 to 300 MW range may be provided. High engine efficiency is facilitated by operating the individual engines at sweet spots where there is open throttle operation (or near open throttle operation) and controlling the power of an individual module by turning individual engines on and off; and/or turning various power modules on and off.

The modified automotive engines may be fueled by a wide range of mixtures of ammonia and hydrogen from ammonia decomposition: the range could include operation on greater than 95% hydrogen or greater than 95% ammonia. The electricity of each generator would be converted to DC using rectifiers.

This DC approach removes the constraint of having to operate the generators at only certain values of rpm so as to produce AC power at a desired frequency (e.g. 60 Hz). This can allow the use of relatively high frequency, decreasing the size of the required transformers and simplifying the filtering. It enables the engine rpm to vary and avoids the need to synchronize the multiplexed engine generators. If desired, the aggregated DC power could be converted to 60 Hz or 50 Hz. In contrast to the case where the engines are constrained to run at specific values of rpm to get a certain AC output from the generators, the engine rpm in the DC engine generator sets can then be adjusted over a wide range so as to be run at operation parameters that provide increased power density levels (which can reduce cost/KW) while also providing the necessary combustion stability.

The use of the ammonia engines discussed above would be particularly attractive for low (e.g. 10% or less) to moderate (e.g. 20% or less) capacity factor applications for grid energy storage.

Cold Start of Reformer

During cold start, the HX/reformer and the HX preheater need to be brought to temperature. Several means may be used to achieve fast rates of heating and minimizing operation when the waste heat recovery is not operational because of low temperatures.

One means to heat is to generate high temperature engine exhaust. High temperature exhaust may be achieved by using spark retard and other means that decrease the instantaneous engine efficiency, resulting in increased exhaust temperature. The increased exhaust temperature may be used to quickly raise the temperature of the HX/reformer and the catalyst.

Another means to raise the temperature of the HX's quickly is to heat them directly using electricity. The electricity may come from batteries, or it may be generated by the system. Because some of the electricity is being diverted to heating the components, increased engine power is needed to provide the desired electricity, forcing the system to operate at higher power and thus increasing the availability of waste heat for rapid component heating.

A third way to raise the temperature of the HX's quickly is to combust a fraction of the fuel directly to warm the components. The fuels, alcohols, ammonia or other, is combusted by mixing with air. The products may be used to heat the components directly, or the combustion products may be mixed with the engine exhaust upstream from the HX components that require rapid heating, avoiding the addition of plumbing that would otherwise be needed. Once the catalyst starts warming, it is also possible to combust the hot hydrogen rich gas generated by the decomposition/dissociation of the fuels for directly preheating the components.

Once the system is warm, the process reverts to normal operation, without the use of inefficient engine operation or external heating (through either electric or combustion means) of the components.

Under some circumstances when the available heat is not sufficient to provide the desired dissociation of the fuel, it is possible to augment the exhaust heat with either electric or combustion means. Some of the electricity produced by the system may be used to supplement the exhaust heat.

Alternatively, some of the fuel or some of the hydrogen rich gas produced by the dissociation of the fuel may be combusted to provide the required energy for the desired endothermic dissociation of the fuel. It should be noted that the system may operate with only a fraction of the fuel being dissociated. Preferred embodiments for this option would use dissociated fuel fractions of 158-25% for the case of hydrogen assisted combustion of the fuel in the engine. Higher dissociation increases the power developed by the turbine/expander, as the volume of the gaseous fuel increases with dissociation of the fuel, increasing the volumetric flows and the power generated by the turbine expander. Higher dissociation also increases the amount of waste heat that is recovered by the system. The engine can operate efficiently over a wide range of dissociated fuel fractions.

Multifuel Operation

The engines that are described above can be operated on multiple fuels. When the stored fuel suitable for dissociation (alcohols, ammonia, etc.) is exhausted or is estimated to be exhausted or is of limited availability, the engine may operate either on a second fuel (for example, a fossil fuel such as natural gas, gasoline, propane) or it may operate on two fuels, with the second fuel being introduced into the engine, and the dissociation fuel being used through the dissociation for effective waste energy recovery. When the dissociation fuel is fully exhausted, the engine system operates exclusively with the second fuel (e.g. a fossil fuel). and there is no waste energy recovery.

FIG. 13 shows such a case. Alternatively, the expander turbine can operate on steam. In this case, water from an onboard source (water tank) could be used for the heat recovery. In a preferred embodiment for this option, downstream from the expander turbine, the water is released to the environment to avoid the need for a condenser and to reduce load to the thermal management system of the engine.

An engine generator or more than one engine generator with the features that are described above could also be used in a series hybrid (or plug-in series hybrid) powertrain in a car, truck or off road vehicle as well as in a station electric power source

Use of Reforming for Alcohol Engine Cold Start

Cold start of a reciprocating engine may be an important issue for alcohol fuels. The same reformer that is used for exhaust heat recovery may also be used for converting E100, M100 or high alcohol concentration alcohol-gasoline mixtures (e.g. greater than E90 or M90) into hydrogen rich gas that would reduce emissions during cold start. Not all of the high concentration alcohol fuel needs to be converted into hydrogen rich gas. The reformer may be operated with partial oxidation and/or electrically based heating (e.g. plasma or resistive or microwave heating).

In a preferred embodiment, the dissociation reformer is heated electrically to provide sufficient hydrogen generation during the cold start, as well as to preheat the fuels before introduction into the engine. In this case, the syngas cooler should be avoided. The dissociative reformer may use a nonthermal plasma process for operation at temperatures ranging from ambient temperature to the operating temperature. The electric power from the nonthermal plasma may be used to both drive the dissociating reaction as well as to heat the catalyst. Once the system reached normal operating conditions, the nonthermal plasma can be shut down.

In the US ethanol-gasoline blends greater than those in E85 fuels (which can range from 83% ethanol to 51% ethanol by volume depending on location and time of the year)) are presently not allowed in on-road vehicles because of cold start emissions. A certain fraction of gasoline is required to provide the necessary cold start conditions to keep pollutant emissions at an acceptably low level. By enabling operation with the high allowed ethanol concentrations (especially with 83% ethanol), a substantially larger greenhouse reduction can be obtained.

The fraction of ethanol-based fuel that needs to be reformed in the heat energy recovery reformer to meet the present rules may be determined by various factors including the fraction of ethanol in the ethanol gasoline mixture. Alternatively, a separate reformer that provides the same cold start function as the partial oxidation and/or electric heating in the heat recovery reformer may be used. This reformer may be used in vehicles that have exhaust heat recovery system.

Use of a Different Fuel for Engine Cold Start

An alternative solution to using reforming to address the engine cold start issues is to provide a second fuel that does not have the cold start issue. For example, a solution to the present U.S. issue of having to use E85 with less than 83% ethanol at certain times of the year is to provide a second fuel, which is gasoline or an ethanol-gasoline mixture with a sufficiently low ethanol concentration (i.e. 51% or less) for use during the cold start period (e.g. the first 100 seconds) of engine operation.

One option for providing this cold start fuel is a small separate tank that is externally filled by a pump or container with gasoline or E10. The amount of gasoline or E10 that is used for cold start of a long haul truck could be very small compared to the volume of E85 used in the rest of a drive cycle because of typical long driving periods (e.g. considerably less than 1% for a driving period of 8 hours). An alternative to using gasoline or E10 is to employ another ethanol-gasoline fuel blend has the low ethanol concentration (e.g. 51% ethanol or less) needed to meet a seasonal requirement. Another option is to use gasoline or a suitable ethanol-gasoline mixture that is separated out from E85 by an onboard fuel separator or by a fuel separator at an E85 pump. These options would allow presently specified flex fuel E85 with an 83% ethanol concentration to be used under all conditions.

A further enhancement in greenhouse gas reduction from ethanol could be obtained by an EPA rule change that would allow E100 or ethanol-gasoline blends with very high ethanol concentration (e.g. E90 or higher) use in the engine if a second ethanol-gasoline blend which has an gasoline concentration of less than 51% is used for cold start.

The activation and duration of the use of the cold start fuel may be determined by a control system which uses real-time measurements that include ambient air temperature, elevation, date, engine temperature, coolant temperature and/or hydrocarbon emissions in the vehicle exhaust. The control system may use this information to ensure that the specific E85 fuel blend (between 83% and 51% ethanol) that is required by current EPA rules for a certain location and date (or a blend with a higher gasoline concentration) is employed for a sufficient duration. This control system may be used every time the engine is started to determine if the cold start fuel should be employed.

The uses of a second fuel for cold start of engines that is described above may be employed in stationary power spark ignition engines (for example, container electric power modules that use multiple engines described previously) as well as for vehicles.

IV. Further Enhancements for the Exhaust Treatment System for Hydrogen and Ammonia Engines As described in Section 1, the use of stoichiometric or substantially stoichiometric air-fuel operation together with a three-way catalyst (TWC) followed by an optimized selective catalytic reduction (SCR) system may be used to reduce engine NOx to extremely low levels if the TWC works with the 98% to 99% NOx reduction efficiency that is typical for use with a spark ignition engine that is powered by a hydrocarbon fuel. However, in contrast to engines that are fueled with hydrocarbon fuels, such as gasoline, natural gas, ethanol, methanol and propane, the NOx reduction capability using this enhanced exhaust treatment (EET) system may be considerably less effective for the exhaust from hydrogen and ammonia fueled engines where hydrocarbons are not available to react with NOx. Moreover, for ammonia, the absence of hydrocarbon emissions from the engine can cause production of nitrous oxide emissions from the three-way catalyst.

This issue with hydrogen and ammonia fueled engines may be addressed by providing a small amount of a hydrocarbon fuel from a separate tank into the engine exhaust stream that enters the three-way catalyst. Hydrocarbon fuels which may be used include methanol, ethanol, gasoline or mixtures of ethanol or methanol with gasoline (e.g. E85 or M85). The amount of this “hydrocarbon exhaust fluid” (HEF) may be controlled so as to provide the desired reduction of NOx while also keeping the amount of HEF that is used below a certain level. For example, the HEF level may be kept below 2% (by energy), and preferably, less than 1% (by energy) of the hydrogen or ammonia fuel that is used to power the engine.

Figure 14:
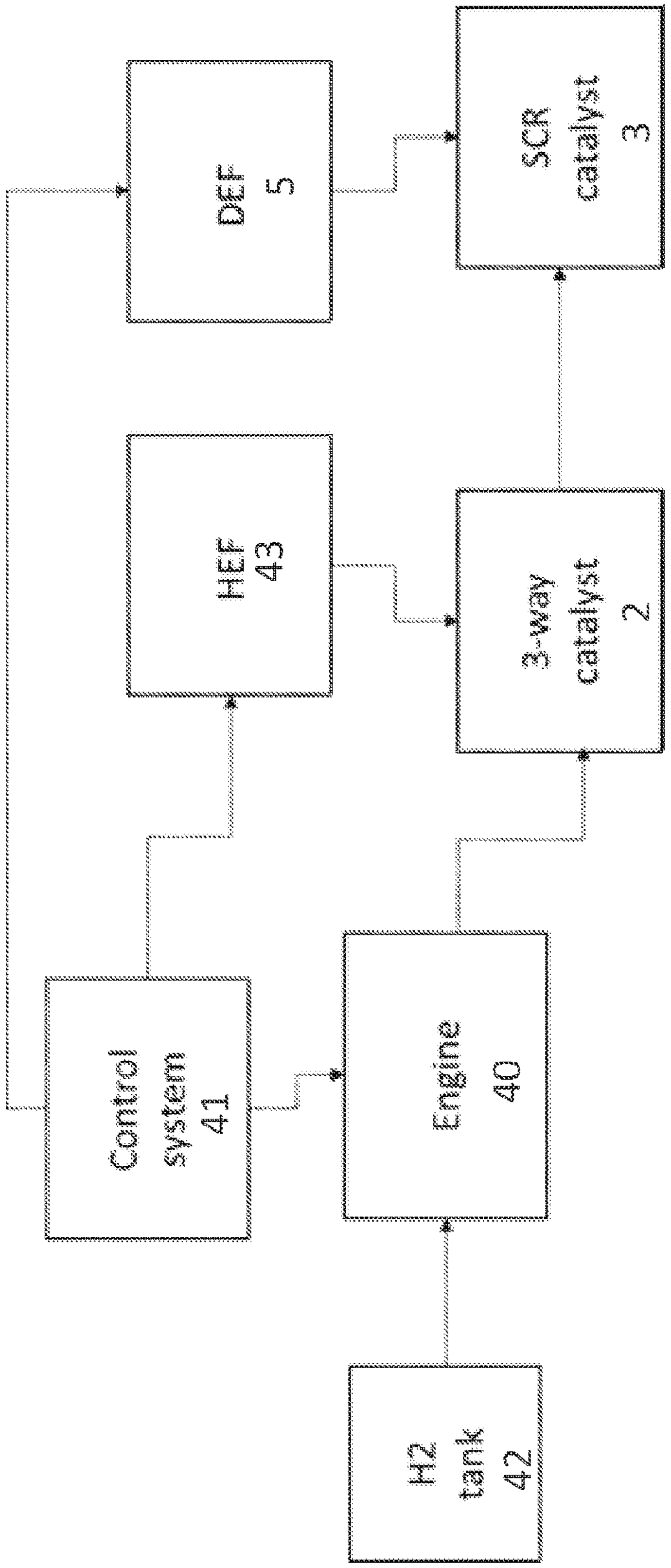
FIG. 14 shows an engine that is fueled with hydrogen and use of a hydrocarbon exhaust fluid (HEF) is employed to obtain the desired operation of the three-way catalyst.

FIG. 14 shows a schematic diagram for an engine 40 that is fueled with hydrogen 42 and use of HEF 43 is employed to obtain the desired operation of the three-way catalyst 2. A control system 41 is used to control this engine 40. An illustrative HEF 43 may be ethanol or an ethanol-gasoline mixture, such as E85. The amount of HEF 43 can be varied as a function of the hydrogen that is introduced into the engine 40. Two exhaust treatment fluids are used: the HEF 43 for the TWC and DEF 5 (Diesel Exhaust Fluid) for the SCR exhaust treatment. The amount of HEF fluid use (measured in gallons/hour or gallons/mile of operation) may be less than the DEF use. The amount of HEF 43 that would be used may be varied using closed loop control that uses an NOx detector. It may also be controlled using open loop control with a look up table where the look up table may use information about engine speed, torque or pressure.

The hydrogen engine 40 can use EGR (exhaust gas recirculation) to prevent pre-ignition that would otherwise occur. The amount of EGR may be varied so as to reduce or minimize its use as engine conditions vary. Open and/or closed loop control may be used to control the amount of EGR so as to prevent pre-ignition (which can occur due on hotspots, for example) while also not being at a level that is high enough to cause a misfire. A misfire detector may be used in a closed loop control system to limit the amount of EGR that is used.

Figure 15:
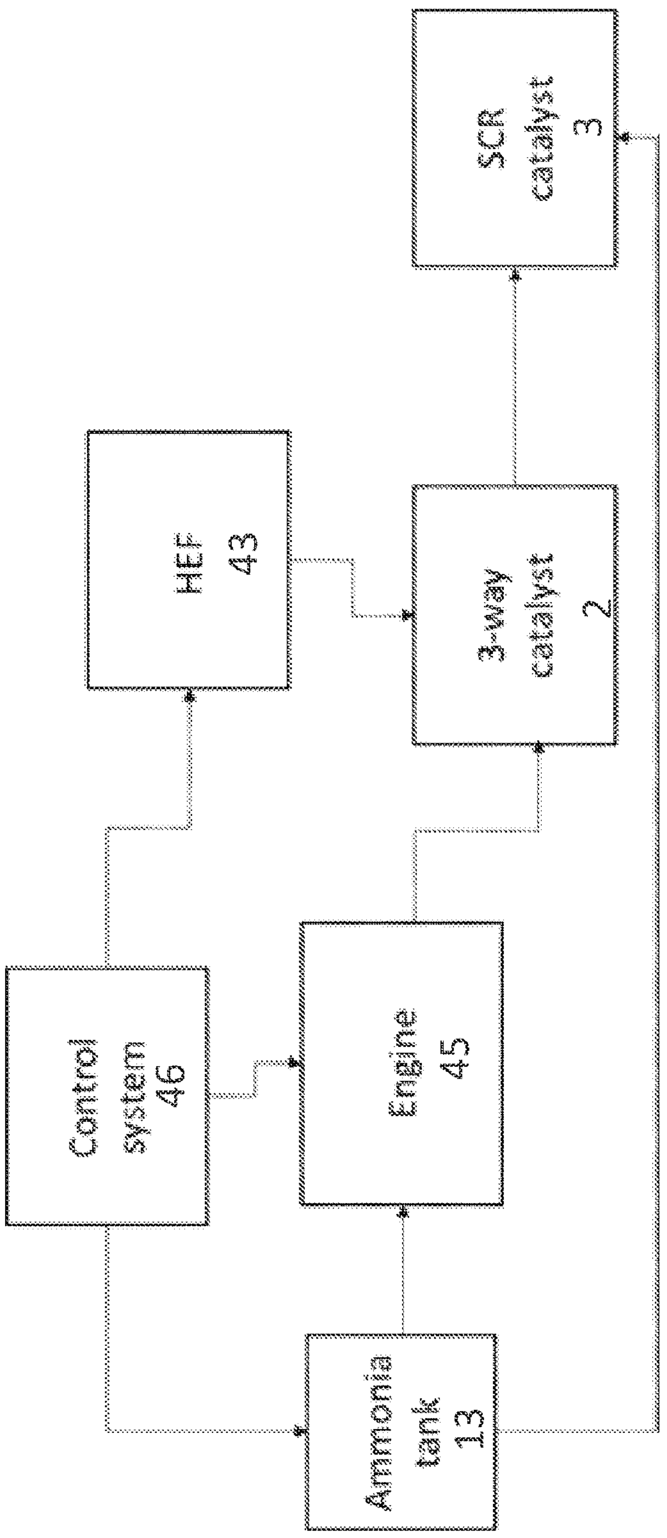
FIG. 15 shows an engine fueled with ammonia and uses a three-way catalyst and an SCR for exhaust treatment.

FIG. 15 shows a schematic diagram for an engine 45 fueled with ammonia 13 and uses a three-way catalyst 2 and an SCR 3 for exhaust treatment. Ammonia 13 from the tank that holds the ammonia for the engine 45 is also used for the SCR 3.

In the exhaust treatment systems in both FIG. 14 and FIG. 15, there is need for introduction of free oxygen into the SCR catalyst 3.

The ammonia engine may also be fueled by mixtures of ammonia 13 and an alcohol, which is methanol or ethanol. These alcohols provide a high flame speed. A small amount of alcohol (methanol or ethanol) provided by a separate tank can substantially increase the combustion stability of the engine. This nis described in Section 2.

Figure 16:
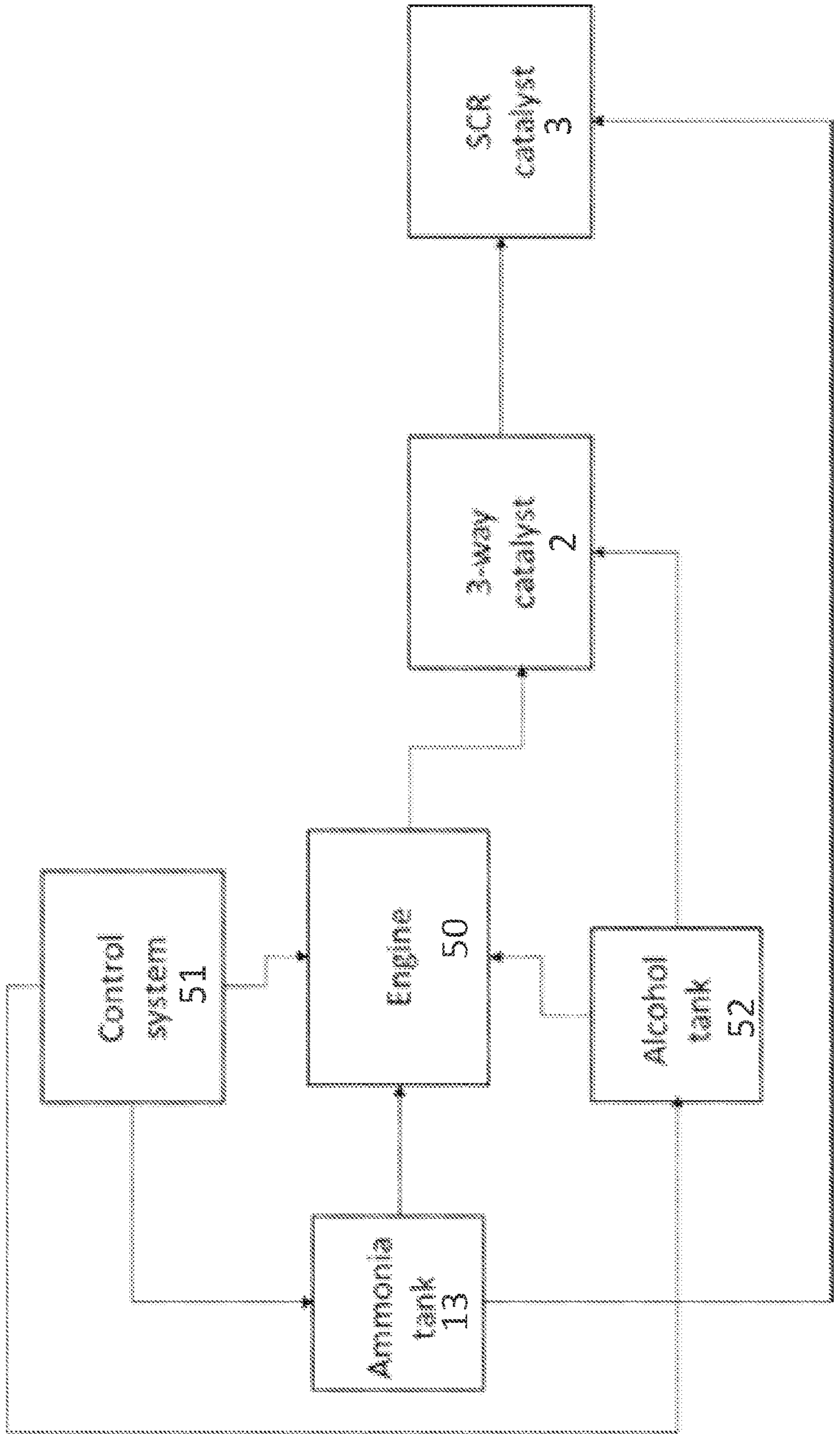
FIG. 16 shows an engine where alcohol is in a separate tank from the ammonia and can be sent to fuel injectors that introduce it to engine cylinders and/or to the exhaust stream from the engine that is introduced into the three-way catalyst.

The alcohol source that is used for combustion stability in the ammonia powered engine can also serve as the hydrocarbon exhaust fluid (HEF) 43. This shown in FIG. 16 where the alcohol 52 is in a separate tank from the ammonia 13 and can be sent to fuel injectors that introduce it to engine cylinders and/or to the exhaust stream from the engine 50 that is introduced into the three-way catalyst 2.

The amounts of alcohol 52 that are introduced into the engine 50 and into the exhaust from the engine 50 prior to its introduction to the three-way catalyst 2 may be separately controlled. The amount of alcohol 22 to be sent to the engine 50 may be controlled by a closed loop control system 51 that includes a misfire detector and/or a look up table which controls the amount of alcohol based on engine parameters that may include torque, speed and/or pressure. The amount of alcohol 22 that is sent to the engine exhaust stream may be controlled by a closed loop detector that detects NOx or nitrous oxide. It may also be controlled by a look up table that includes use of information about how much alcohol is added to the engine as a function of engine parameters that may include engine torque, speed and or/pressure.

Another option is use of methanol or some other hydrocarbon only as hydrocarbon exhaust fluid and to provide combustion stability for ammonia engine operation by incompletely converting some of the ammonia to hydrogen at low temperature using engine exhaust heat. This option may use a catalyst to convert a modest fraction of ammonia by endothermic the into hydrogen decomposition. The hydrogen is then added to the rest of the ammonia for combustion in the engine, with the engine exhaust providing all of the heat required for the ammonia decomposition process. For this operation, only a fraction of the ammonia introduced into the ammonia decomposition catalytic reactor and incomplete conversion to hydrogen is acceptable because the hydrogen is used as a combustion enhancer. This allows relatively low temperature operation in the ammonia decomposition catalytic reactor, which enables the use of engine exhaust alone for providing the heating needed for the endothermic catalytic conversion of ammonia to hydrogen and nitrogen. Additional heating is not needed for this incomplete combustion. For this mode of operation, methanol or some other hydrocarbon is only used as a hydrocarbon exhaust fluid to increase the effectiveness of the three-way catalyst. The fraction of ammonia that is sent to the decomposition catalyst may be determined by the combustion stability requirement at various engine values of torque, speed and pressure or other engine parameters. A control system using closed loop and/or open loop control may determine the fraction of ammonia that is sent to the ammonia decomposition catalyst at various values of engine parameters. The ammonia that is not converted into hydrogen may be sent to the engine along with hydrogen that is produced.

An additional option is to use both hydrogen from catalytic decomposition of ammonia as described in the previous paragraph and optimized addition of methanol or ethanol to the ammonia for increasing combustion stability.

Spark ignition engines operated with a stoichiometric or substantially stoichiometric fuel/air ratio and using the enhanced exhaust treatment (EET) systems described above could be operated as "fuel-flexible", "multi-fuel" or "omni-fuel" engines that may provide important greenhouse gas reductions using present widely available ethanol or ethanol-gasoline mixtures. These fuel-flexible engines could also be fueled with methanol, methanol-gasoline mixtures, natural gas or renewable natural gas.

One use of these fuel flexible engines with EET may be in electricity generation systems that provide power for grid resilience and extended duration (1 day through seasonal) energy storage. Fuel-flexible operation increases robustness and use of the power systems for greater use of greenhouse gas reducing fuels as they become available. EET operation may facilitate substantially greater flexibility in electricity generation system location including greater use of decentralized locations. These engine powered generator systems may also be important for backup power for data centers, hospitals and other critical facilities.

Fuel-flexible engines with EET may also find applications in engines for long-haul trucks, off-road vehicles and marine transportation.

Note that the embodiments described in Sections 1-4 may be utilized independently, or may be used in any combination to enhance the performance and operation of an engine.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A spark ignition engine that is fueled with both ammonia and hydrocarbon fuel;

wherein the hydrocarbon fuel is provided by a hydrocarbon fuel tank that is separate from a fuel tank that provides the ammonia;

wherein an amount of the hydrocarbon fuel that is varied as at least one of engine speed, engine torque and engine temperature varies;

wherein at least one of open and closed loop control is used to determine the amount of hydrocarbon fuel that is used to fuel the engine;

wherein hydrocarbon fuel from the hydrocarbon fuel tank is added to exhaust stream from the spark ignition engine before it enters a three-way catalyst and wherein the amount of hydrocarbon fuel that is added to the exhaust stream is varied as a function of at least one of engine torque and speed; and wherein NOx in exhaust that emerges from the three-way catalyst is reduced by adjusting the amount of hydrocarbon fuel that is added to the exhaust stream from the spark ignition engine as at least one of engine torque and speed varies.

2. The spark ignition engine of claim 1, wherein the amount of the hydrocarbon fuel that is introduced into the exhaust stream from the spark ignition engine is determined by closed loop control using a measurement of NOx that is in the exhaust stream from the three-way catalyst.

3. The spark ignition engine of claim 1, wherein the amount of the hydrocarbon fuel that is introduced into the exhaust stream from the spark ignition engine is determined by open loop control using a lookup table that employs information about engine speed, and torque.

4. The spark ignition engine of claim 1, wherein the spark ignition engine is fueled with a substantially stoichiometric air fuel ratio.

5. The spark ignition engine of claim 1, wherein the hydrocarbon fuel is methanol or a methanol-gasoline mixture.

6. The spark ignition engine of claim 1, wherein the hydrocarbon fuel is methanol or a methanol-gasoline mixture and wherein the methanol is a low-carbon methanol that is produced from at least one of biomass, waste and CO2.

7. The spark ignition engine of claim 1, wherein the hydrocarbon fuel is ethanol or an ethanol-gasoline mixture.

8. The spark ignition engine of claim 1, wherein the exhaust stream from the three-way catalyst passes through an SCR catalyst and wherein air and diesel exhaust fluid are added to the exhaust stream from the three-way catalyst prior to its entrance into the SCR catalyst.

9. The spark ignition engine of claim 1, wherein the exhaust stream from the three-way catalyst passes through an SCR catalyst and wherein air and diesel exhaust fluid are added to the exhaust stream from the three-way catalyst prior to its entrance into the SCR catalyst and wherein the air is preheated by employing a heat exchanger using heat sources that include engine coolant or exhaust downstream from the SCR catalyst.

10. The spark ignition engine of claim 1, wherein fueling provided by the hydrocarbon fuel is varied so as to avoid misfire as at least one of engine torque, engine speed and engine temperature varies.

11. The spark ignition engine of claim 1, wherein fueling provided by hydrocarbon fuel is varied so as to provide a desired level of combustion stability as at least one of engine torque, speed and temperature varies.

12. The spark ignition engine of claim 1, wherein a fraction of fueling provided by the hydrocarbon fuel is varied so as to reduce the amount of hydrocarbon fuel that is introduced into the engine as at least one of engine torque, speed and temperature varies while the amount of hydrocarbon fuel is sufficient to avoid misfire.

13. The spark ignition engine of claim 1, wherein the fueling provided by the hydrocarbon fuel is varied so as to minimize the amount of hydrocarbon fuel that is introduced into the engine as at least one of engine torque, speed and temperature varies while the amount of hydrocarbon fuel is sufficient to avoid misfire.

14. The spark ignition engine of claim 1, wherein the amount of hydrocarbon fuel that is introduced into the engine is determined by use of information about combustion stability.

15. The spark ignition engine of claim 1, wherein the hydrocarbon fuel is ethanol, a fuel mixture that includes ethanol, methanol or a fuel mixture that contains methanol.

* * * * *